United States Patent
Degelman

(10) Patent No.: US 9,936,621 B2
(45) Date of Patent: Apr. 10, 2018

(54) CULTIVATOR

(71) Applicant: Scott Degelman, Regina (CA)

(72) Inventor: Scott Degelman, Regina (CA)

(*) Notice: Subject to any disclaimer, the term of this patent is extended or adjusted under 35 U.S.C. 154(b) by 277 days.

(21) Appl. No.: 14/434,686

(22) PCT Filed: Oct. 10, 2013

(86) PCT No.: PCT/CA2013/000852
§ 371 (c)(1),
(2) Date: Apr. 9, 2015

(87) PCT Pub. No.: WO2014/056077
PCT Pub. Date: Apr. 17, 2014

(65) Prior Publication Data
US 2015/0271981 A1    Oct. 1, 2015

Related U.S. Application Data

(60) Provisional application No. 61/712,086, filed on Oct. 10, 2012.

(51) Int. Cl.
| | |
|---|---|
| *A01B 21/08* | (2006.01) |
| *A01B 49/02* | (2006.01) |
| *A01B 29/06* | (2006.01) |
| *A01B 73/04* | (2006.01) |
| *A01B 29/04* | (2006.01) |
| *A01B 73/06* | (2006.01) |

(52) U.S. Cl.
CPC .......... *A01B 21/08* (2013.01); *A01B 21/086* (2013.01); *A01B 29/048* (2013.01); *A01B 29/06* (2013.01); *A01B 49/027* (2013.01); *A01B 73/048* (2013.01); *A01B 73/065* (2013.01)

(58) Field of Classification Search
CPC ..... A01B 21/08; A01B 21/086; A01B 29/048; A01B 29/06; A01B 29/027; A01B 73/048; A01B 73/065
USPC ................. 172/151, 181, 176, 178
See application file for complete search history.

(56) References Cited

U.S. PATENT DOCUMENTS

| | | | | |
|---|---|---|---|---|
| 3,810,660 A | * | 5/1974 | Peterson | B62D 63/061 |
| | | | | 172/272 |
| 4,425,971 A | * | 1/1984 | Allen | A01B 73/02 |
| | | | | 172/311 |
| 4,896,732 A | * | 1/1990 | Stark | A01B 73/02 |
| | | | | 172/311 |

(Continued)

*Primary Examiner* — Jamie L McGowan
(74) *Attorney, Agent, or Firm* — Craig J. Lervick; Larkin Hoffman Daly & Lindgren, Ltd.

(57) ABSTRACT

A cultivator can have a frame with a tow assembly so that the cultivator can be towed by a tractor. A cultivating assembly can be pivotally attached to the rear of the frame. The cultivating assembly can have a plurality of discs that engage and penetrate the soil beneath the cultivating assembly. The cultivating assembly can have a center section pivotally connected to the rear end of the frame, a first wing section pivotally connected to one side of the center section, a second wing pivotally connected to the other side of center section where all the sections have discs connected to them. A pair of ground wheels can be connected to the center section so that the ground wheels are positioned in front of the cultivating assembly when it is being used to cultivate a field.

63 Claims, 20 Drawing Sheets

(56) References Cited

U.S. PATENT DOCUMENTS

| | | | | |
|---|---|---|---|---|
| 6,119,792 A * | 9/2000 | Almer | ............... | E02F 3/7668 |
| | | | | 172/171 |
| 7,036,604 B2 * | 5/2006 | Steinlage | ............ | A01B 63/22 |
| | | | | 172/443 |
| 7,861,795 B2 * | 1/2011 | Dillon | ............... | A01B 73/02 |
| | | | | 172/311 |
| 8,342,256 B2 * | 1/2013 | Adams | ............... | A01B 73/02 |
| | | | | 172/311 |
| 9,351,437 B2 * | 5/2016 | Friesen | ............. | A01B 73/048 |
| 9,516,798 B2 * | 12/2016 | Sudbrink | ........... | A01B 73/065 |
| 2003/0085045 A1 * | 5/2003 | Powell | ............. | A01B 23/046 |
| | | | | 172/181 |
| 2004/0016554 A1 * | 1/2004 | McDonald | ......... | A01B 49/027 |
| | | | | 172/146 |
| 2013/0299204 A1 * | 11/2013 | Achten | ............ | A01B 21/086 |
| | | | | 172/178 |

\* cited by examiner

CULTIVATOR

The present invention relates to an agricultural implement for cultivating soil and more particularly to a disc cultivator of the type towed by a tractor or other tow vehicle.

BACKGROUND

In the agricultural industry, cultivation of soil employs various styles of cultivators and harrows. In cooler climates the most common types are the disc cultivator (sometimes called a disc harrow), the chain harrow, the tine harrow or spike harrow and the spring tine harrow. Chain harrows are often used for lighter work such as leveling the tilth or covering seed, while disc cultivators are typically used for heavy work, such as following plowing to break up the sod. Tine harrows are used to refine seed-bed condition before planting, to remove small weeds in growing crops and to loosen the inter-row soils to allow for water to soak into the subsoil. All three types can be used in one pass to prepare the soil for seeding. It is also common to use any combination of two harrows for a variety of tilling processes. Where harrowing provides a very fine tilth, or the soil is very light so that it might easily be wind-blown, a roller is often added as the last of the set.

The compact disc cultivator is an implement used primarily to break up and smooth soil in preparation for planting and for the task of preparing soil for planting including tilling and leveling of fallow soil.

Turning the soil too deeply is not desirable in most situations because the soil dries out by exposing moist underlying soil. This is a significant problem when water is scarce or irrigation expensive. A cultivator is needed, therefore, that dependably tills on the large scale of a modern disc harrow, but without the problem of soil moisture loss.

SUMMARY OF THE INVENTION

In a first aspect, a cultivator is provided. The cultivator can have a frame having a front end and a rear end and a tow assembly attached to the front end of the frame so the cultivator can be towed by a tow vehicle in a direction of travel. A cultivating assembly can be pivotally attached at a front end of the cultivating assembly to the rear end of the frame so that the cultivation assembly is pivotal around a first axis substantially perpendicular to the direction of travel of the cultivator. The cultivating assembly can have having at least one carriage frame and a plurality of discs attached to the at least one carriage frame, each disc positioned to extend below the at least one carriage frame and come into contact with a ground surface beneath the cultivating assembly, The cultivating assembly can also have a pair of ground wheels positioned in front of the cultivating assembly and in contact with the ground surface when the cultivating assembly is being used to cultivate a field.

In a second aspect, a cultivator is provided. The cultivator can have a frame having a front end and a rear end and a tow assembly attached to the front end of the frame so the cultivator can be towed by a tow vehicle in a direction of travel. A cultivating assembly can be provided that includes a center section having a front end, a rear end, a first side and a second side, the center section pivotally connected at the front of the center section to the rear end of the frame so that the center sections is pivotal around a first axis substantially perpendicular to the direction of travel of the cultivator, a first wing section pivotally connected at one side of the first wing section to the first side of the center section, a second wing pivotally connected at one side of the second wing section to the second side of the center section. The center section, the first wing section and the second wing section can each have a carriage frame and a plurality of discs attached to the carriage frame. A pair of ground wheels connected to the center section, the pair of ground wheels positioned in front of the center section when the cultivating assembly is being used to cultivate a field.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
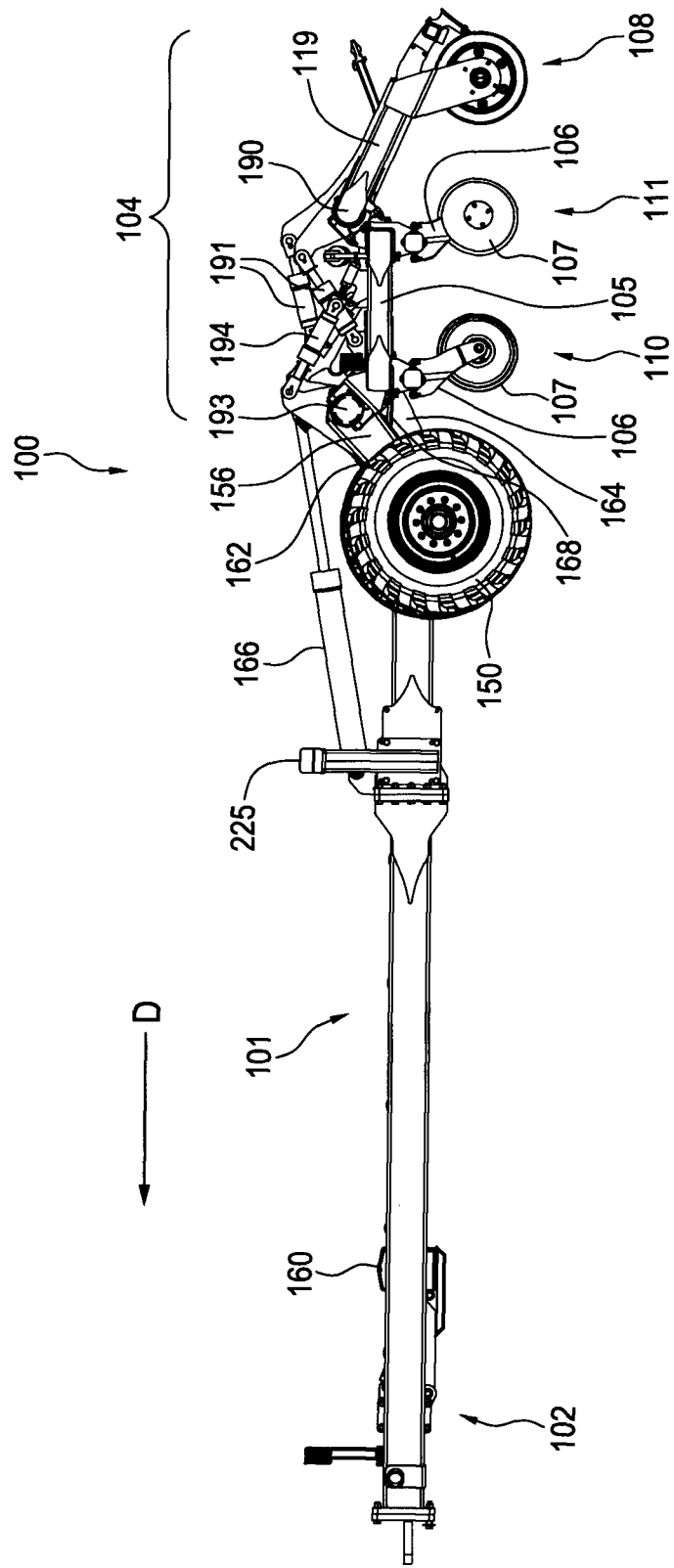
FIG. 1 illustrates a side view of a cultivator.
Figure 2:
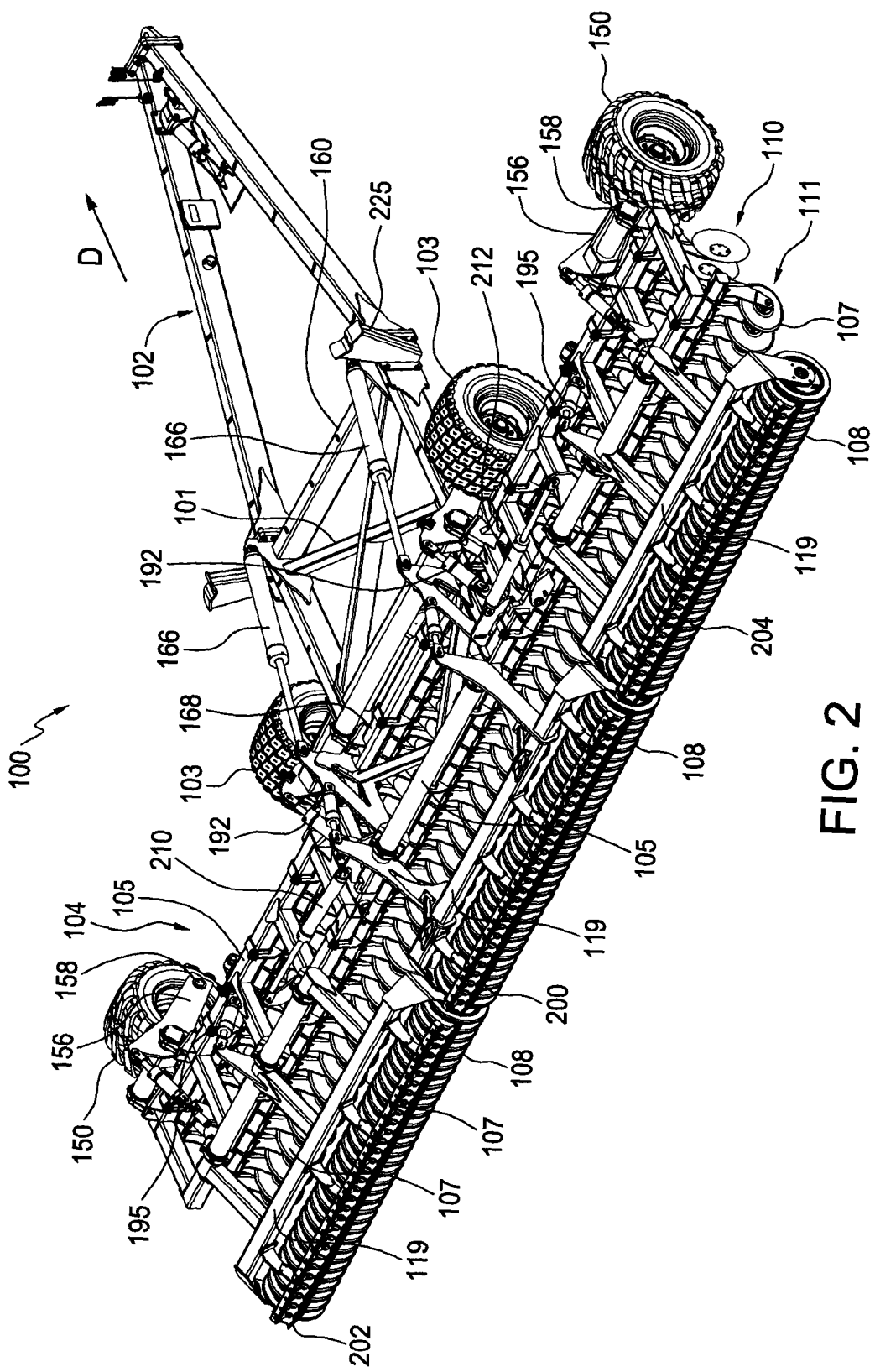
FIG. 2 illustrates a rear perspective view of the cultivator.

FIGS. 1 and 2 illustrates a side view and a rear perspective view, respectively, of a to cultivator 100 for cultivating a field and preparing the field for the planting of a crops.

The cultivator 100 can include a frame 101 adapted to be towed across a field in a direction of travel D using a tow assembly 102, ground wheels 103, support wheels 150, and a cultivating assembly 104 attached to the frame 101.

The tow assembly 102 can be connected to a front end 162 of the frame 101 to allow a tractor (not shown) or other tow vehicle to tow the cultivator 100 in a direction of travel, D. The tow assembly 102 can comprise a manual connection or an electronic/automated connection with the tow vehicle. The tow assembly 102 can be disconnected from a tow vehicle when the cultivator 100 is not in use and may be reattached when the cultivator 100 is to be used. The tow assembly 102 can comprise an A-frame with a horizontal beam disposed between and attached to slanted vertical beams. The apex of the slanted vertical beams can comprise the attachment point of the tow assembly 102 to the tow vehicle. The tow assembly 102 can be attached to the front end 160 of the frame 101 with mechanical fasteners, welding, or any other suitable connection means.

The frame 101 can be attached at its front end 160 to the tow assembly 102 and the cultivating assembly 104 can be pivotally connected to the frame 101 at the rear end 162 so that the cultivating assembly 104 is positioned behind the frame 101 and the ground wheels 103 and support wheels 150 are positioned in front of the cultivating assembly 104 when the cultivator 100 is used to prepare a field. The frame 101 can take many suitable forms and can include horizontally crisscrossing beams and/or an integral "X" shaped beam, or any other added support. In some embodiments, the beams may run between the inner corners of the frame 101 for added stability and to reduce the risk of damage to the cultivator 100. In alternative embodiments, the beams may run horizontally, vertically, diagonally, etc.

Figure 3:
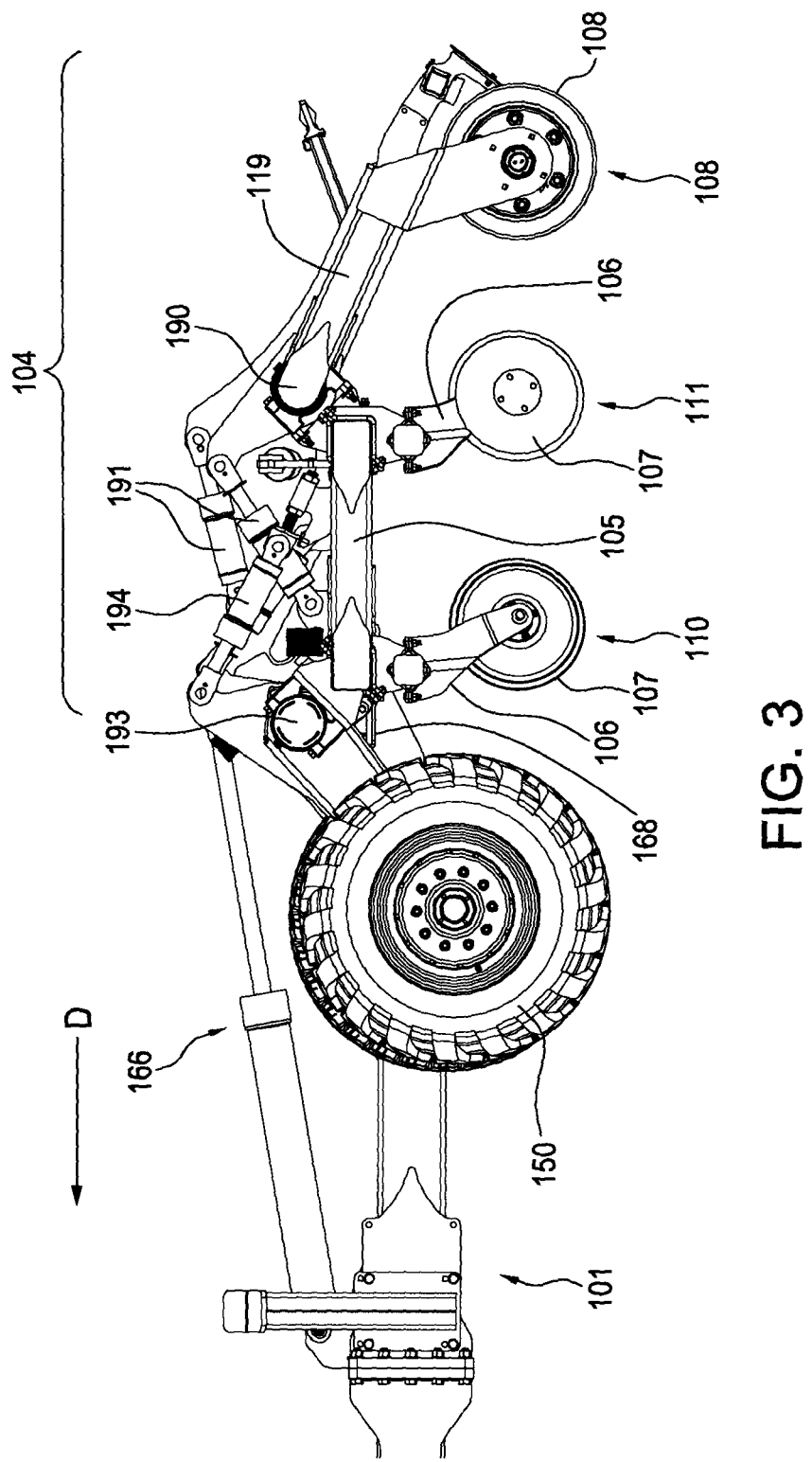
FIG. 3 illustrates a closer side view of the cultivator more clearly showing a cultivating assembly on the cultivator.
Figure 4:
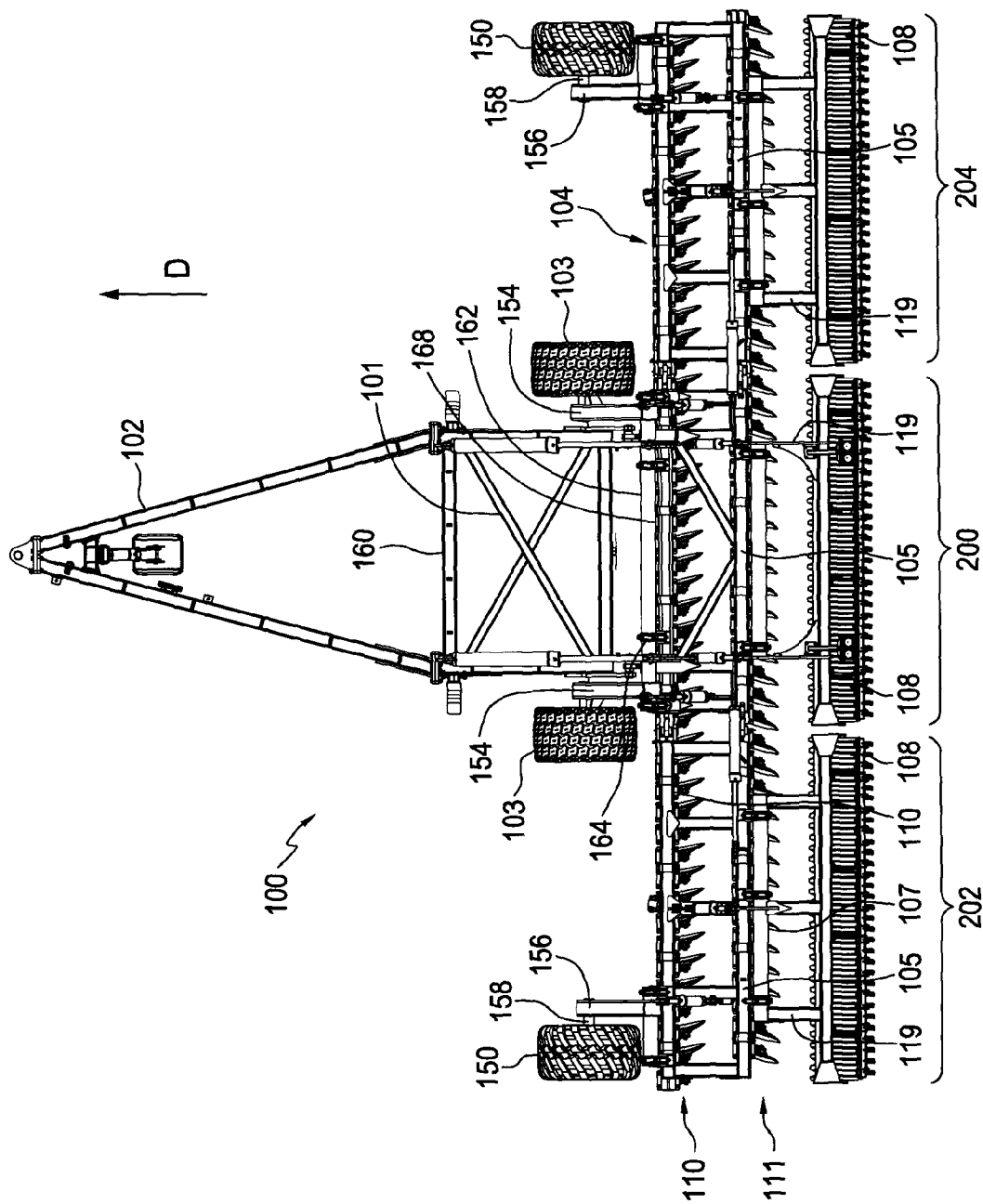
FIG. 4 illustrates a top schematic view of the cultivator.

A front end 168 of the cultivating assembly 104 can be pivotally attached to a rear end 162 of the frame 101 so that the cultivating assembly 104 can pivot around an axis that is substantially perpendicular to the direction of travel D and the cultivating assembly is positioned behind the frame 101 when the cultivator 100 is in use cultivating a field. FIGS. 3 and 4 illustrate a more detailed view of the cultivating assembly 104 and a top view of the cultivator 100, respectively. The cultivating assembly 104 can comprise a carriage frame 105, a plurality of disc arms 106 connected to the carriage frame 105 and supporting a plurality of discs 107, and a finishing tool 108 pivotally connected to the carriage frame 105 by a finishing tool mount 119. The cultivating assembly 104 can prepare the field for the planting of a crop using the discs 107 of the cultivating assembly 104 to break and mix up the soil as the discs 107 come into contact and pass through the soil below the discs 107 as a tow vehicle pulls the cultivator 100 through a field in the direction of travel D. The discs 107 can penetrate the soil, pulverize clods of soil and mix soil and crop residues as the discs 107 are pulled through the soil. The finisher 108 can then pass along the soil that has been mixed up by the discs 107 to level out the soil the discs 107 have passed through.

Figure 5A:
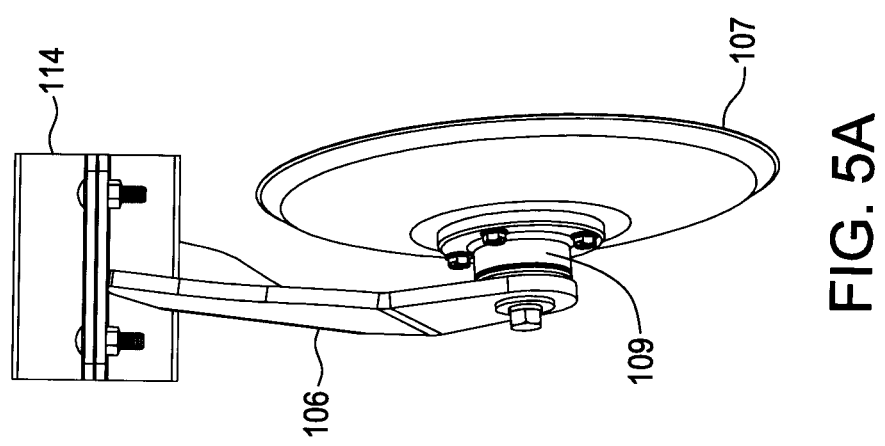
FIGS. 5A and 5B illustrate views of discs and disc arms.
Figure 5B:
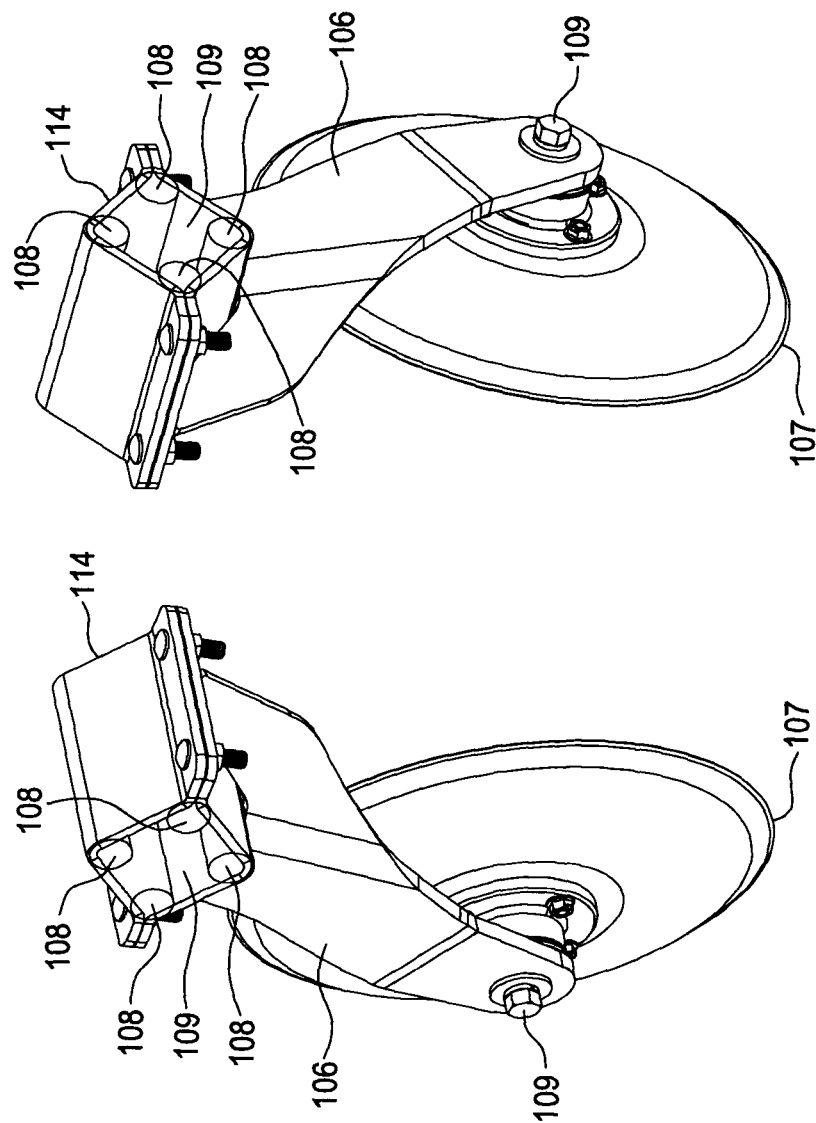

The carriage frame 105 can be a frame for supporting the discs 107 and disc arms 106. Each disc arm 106 can be connected at one end to the carriage 105 and have a disc 107 connected at the other end. The discs 107 may be rotatable about one or more shafts 109. In one aspect, each disc 107 can be associated with a single disc arm 106 and shaft 109 as shown in FIGS. 5A and 5B. In this manner, each disc arm 106 is connected to a single disc 107 so that each disc 107 rotates independently from the other discs 107 and there is no shaft passing between adjacent discs 107 allowing crop material and other debris to easily pass between adjacent discs 107.

Each disc 107 may be substantially circular and have a convex shape with the disc 107 being rounded outwards away from the disc arm 106. In some embodiments, the arm 106 may be curved and/or angled at fixed points, or may comprise a smooth curve from the end of the disc arm 106 connected to the carriage 105 to the axle 109. In some embodiments, the arm 106 may be adapted to angle the disc 107 inwardly, outwardly, or may angle the disc 107 in the direction of movement of the cultivator 100.

Figure 6:
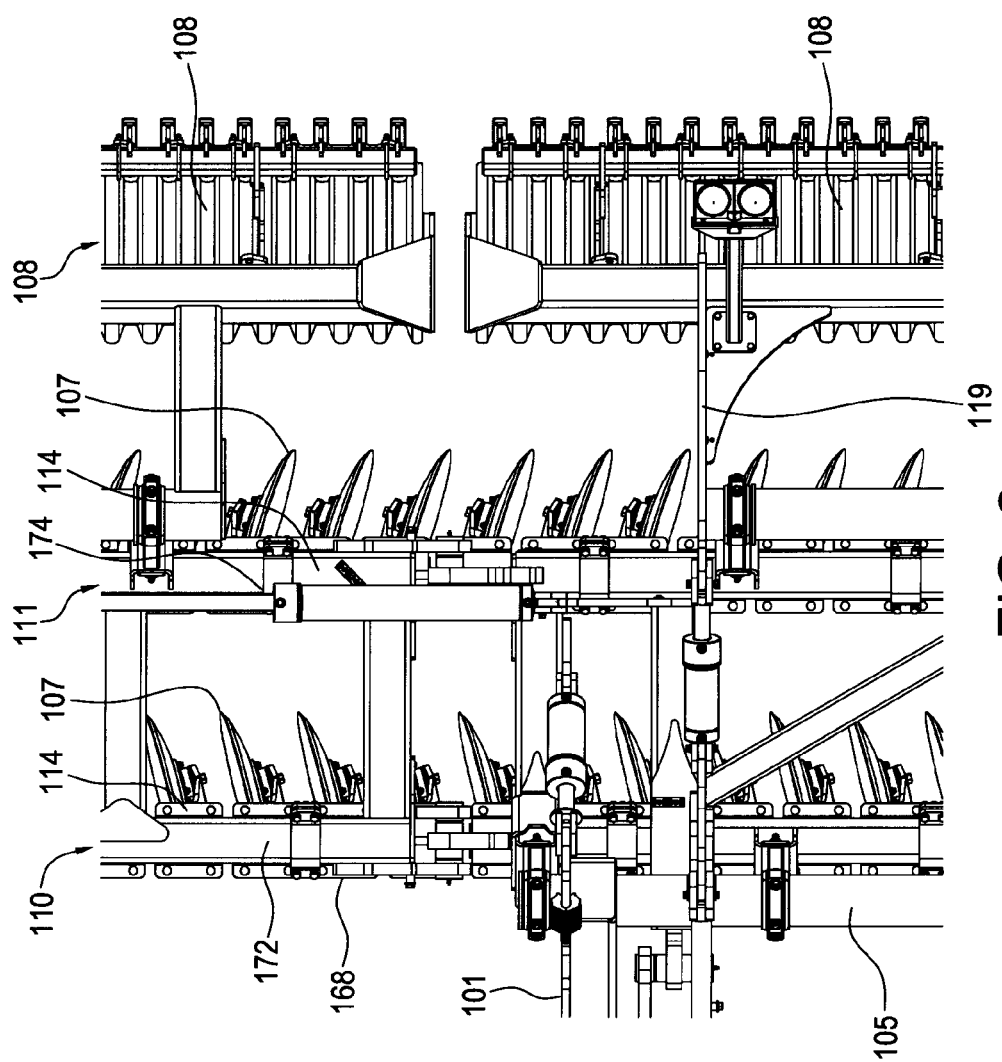
FIG. 6 illustrates a top detail view of a first row of discs and a second row of discs on the cultivating assembly of the cultivator.
Figure 7:
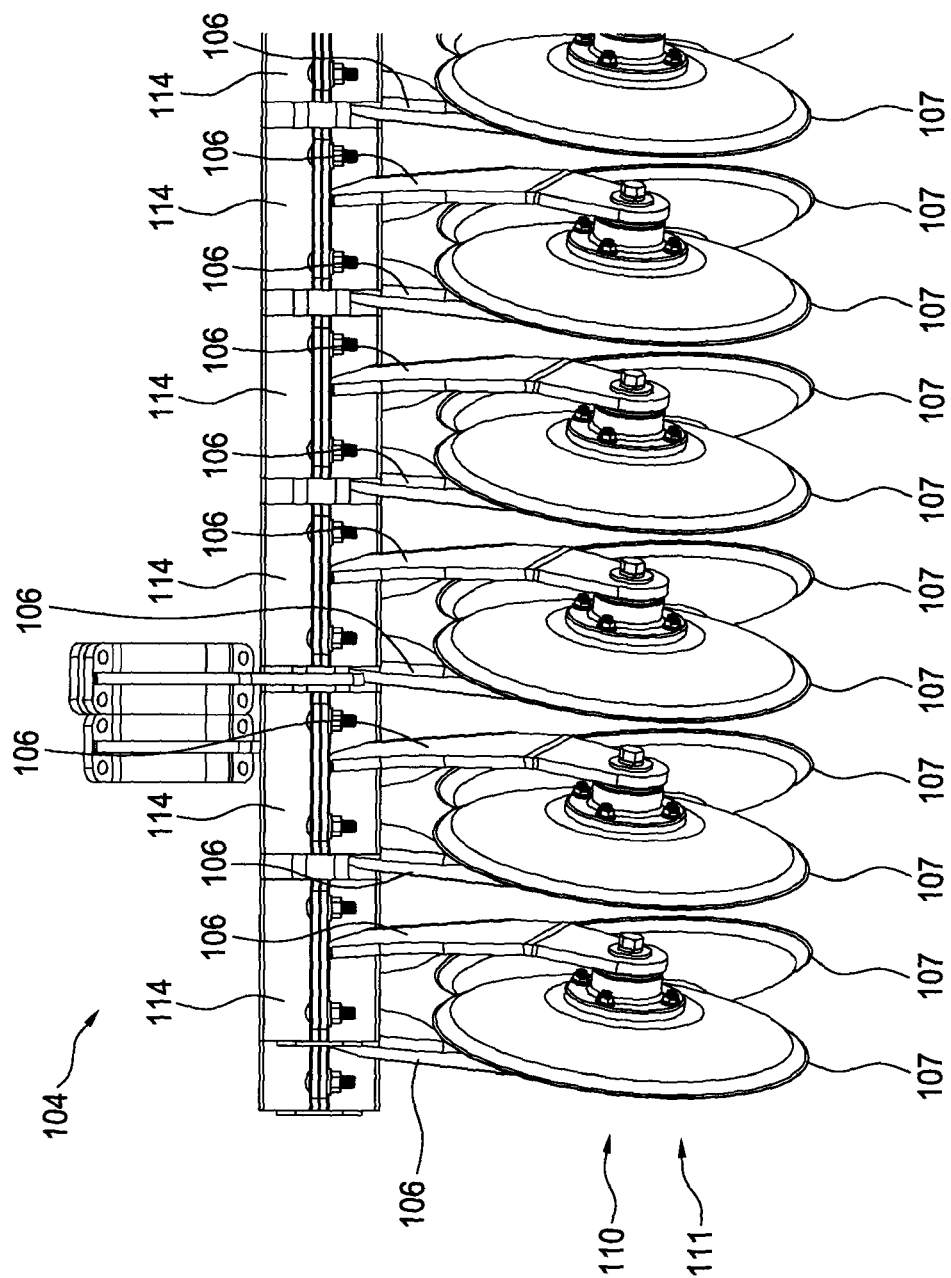
FIG. 7 a front view of the first and second row of discs.

In one aspect, the plurality of discs 107 can be arranged in rows. Referring to FIG. 3, the disc cultivator 100 can have a first row of discs 110 and a second row of discs 111 positioned behind the first row of discs 110. In this manner, soil that is passed over by the cultivator assembly 104 will first pass by the first row of discs 110 and then the second row of discs 111. As can be seen in FIGS. 6 and 7, all of the discs 107 in the first row of discs 110 can be angled in a first direction by the disc arms 106 while all the discs 107 in the second row of discs 111 can be angled in a second direction by the disc arms 106 where the second direction is opposite to the first direction. Generally, the first row of discs 110 and second row of discs 111 can have different directions of concavity with the discs 107 in the first row of discs 110 rounding outwards in one direction and the discs 107 in the second row of discs 111 rounding outwards in an opposite direction, such that they work in tandem to properly cultivate the soil. In this manner, as the discs 107 pass through and over the soil, the first row of discs 110 can pierce the soil at one angle and the second row of discs 111 can pierce the soil at a second angle opposite to a first angle in order to pass over the soil twice and better mix and level the soil.

In one aspect, the carriage frame 105 can include two substantially parallel beams: a font beam 172 and a rear beam 174. Where a set of disc arms 106 can be attached to the front beam 172 and a set of disc arms 106 can be attached to the rear beam 172. Discs 107 connected to the disc arms 106 attached to the front beam 170 can form the first row of discs 110 and discs 107 connected to the disc arms 106 attached to the rear beam 172 can form the second row of discs 111.

In one aspect, the disc arms 106 can be attached to the beams 172, 174 by flanged connectors 114. The flanged connectors 114 allow the disc arms 106 carrying the disc 107 to be bolted onto beams on the carriage frame 105.

In one aspect, the flanged connectors 114 could include a biasing means 109 that allows the disc 107 and disc arm 106 to pivot around the beam that the flanged connectors 114 are attached to. In this manner, if the disc 107 hits a rock or other obstacle that it cannot cut through, the disc arm 106 can rotate relative to the beam, allowing the disc 107 to pivot upwards and pass over the rock or other obstacle. The biasing means 109 will then cause the disc arm 106 to pivot back downwards after the disc 107 has passed over the rock or other obstacle.

In one aspect, the biasing means 109 could take the form of four cylindrical members 180 made of natural rubber or some other elastomer. When the flanged connectors 114 are bolted to a beam of the carriage frame 105, the beam is spaced apart from the flanged connectors 114 by the cylindrical members 180. When the disc 107 hits a rock or other obstacle, the cylindrical members 180 can deform allowing the disc 107 and disc arm 106 to pivot upwards allowing the disc 107 to clear the obstacle. When the disc 107 has passed over the obstacle, the cylindrical members 180 can go back to the original shape and allow the disc arm 106 to rotate downwards again until the disc 107 is back in its original position.

In addition to the mechanical fasteners or as an alternative, the flanged connectors 114 may be welded to the disc arm 106. In some embodiments, the flanged connector 114 may comprise a triangle, curved, or teepee-like shape with a flanged base. In some embodiments, the width of the base of the disc arm 106 may comprise the same or a similar width as the curved portion of the flanged connector 114. In some embodiments, when two flanged connectors 114 are included and oppose each other in connecting to the carriage 105, they may be connected together at the flanged ends via mechanical fasteners and/or via welding, adhesive, and/or the like.

Figure 8:
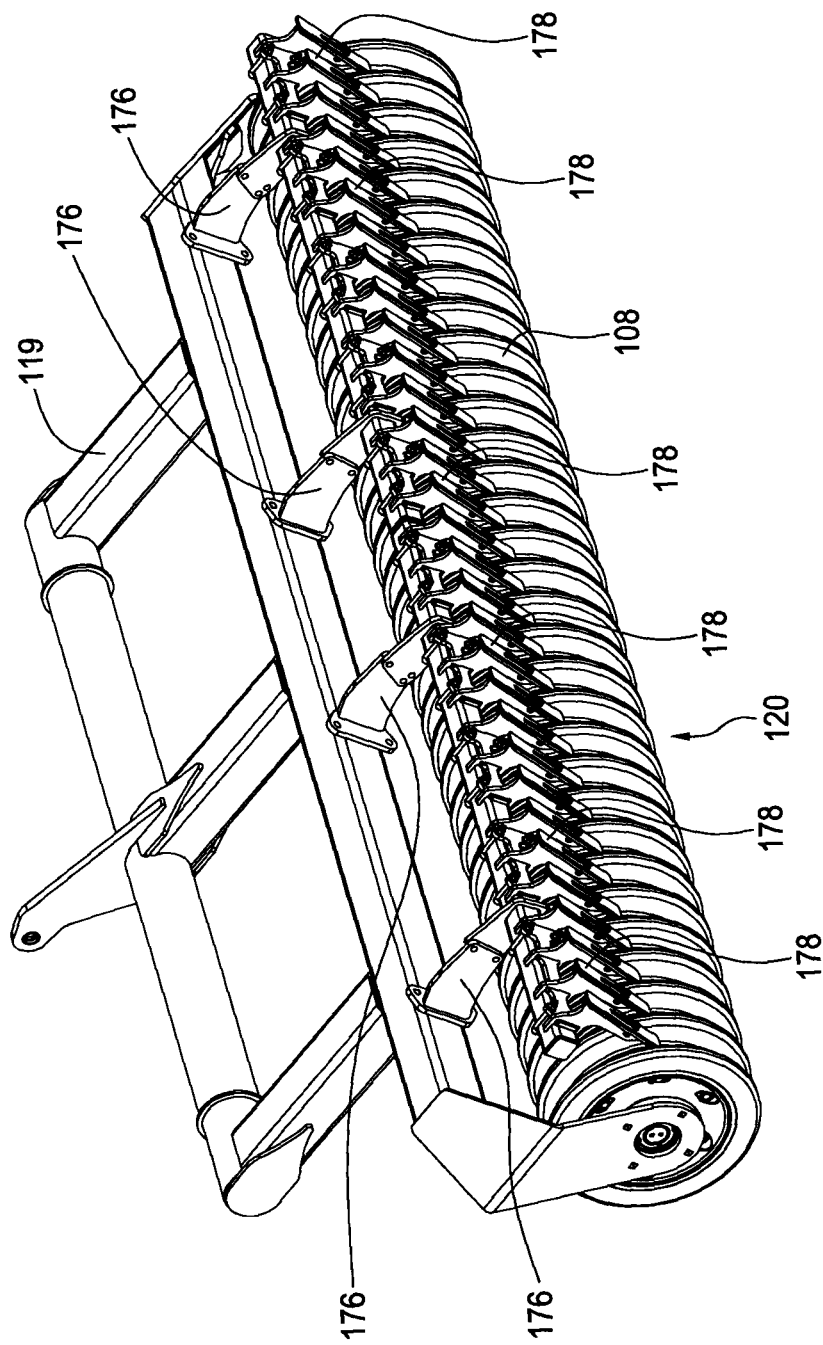
FIG. 8 is a perspective view of a finishing tool and finishing tool mount.

FIG. 8 illustrates a finishing tool 108 in one aspect. The finishing tools 108 is used to level out the soil after the discs 107 pass through it an can comprise any suitable finishing tools. For example, in one embodiment, the finishing tools 108 may comprise a spiked roller, a smooth pipe roller, a mounted basket, a cultipacker, or the like. In another embodiment, the finishing tool 108 may comprise a roller that is used to flatten the loosened soil and break up large clumps of soil after the discs 107 have passed over and through the soil.

The finishing tool 108 can be provided in a finishing tool mount 119 that can be pivotally connected to the carriage frame 105. The finishing tool mount 119 may be adapted to receive a finishing tool 108, such as a roller, and allow the roller to rotate about an axis passing through the ends of the finishing tool mount 119. The finishing tool mount 119 can be pivotally attached to the carriage frame 105 so that the finishing tool 108 can be moved upwards and downwards relative to the carriage frame 105 by pivoting around pivot point 190.

An actuator 191, such as a hydraulic cylinder, etc. can be attached between the carriage 105 and the finishing tool mount 119 and used to rotate the finishing tool 108 around the pivot point 190. In this manner, the finishing tool 108 can be moved downwards and upwards relative to the height of the discs 107 by pivoting it around pivot point 190 using the actuator 191. This allows the depth the discs 107 are set to penetrate the soil to be varied by altering the height of the finishing tool 108 relative to the discs 107 by pivoting the finishing tool mount 119 and around pivot point 190 using the actuator 191.

Figure 9:
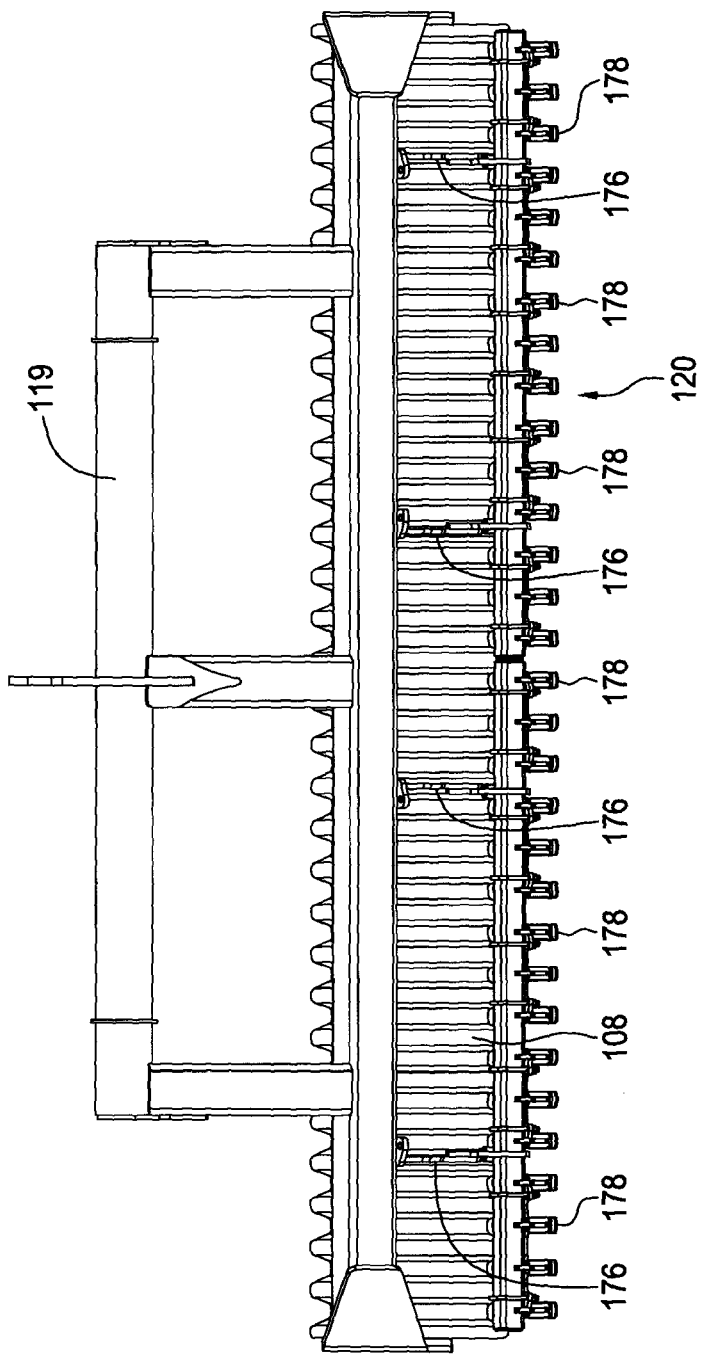
FIG. 9 is a top view of the finishing tool shown in FIG. 8.
Figure 10:
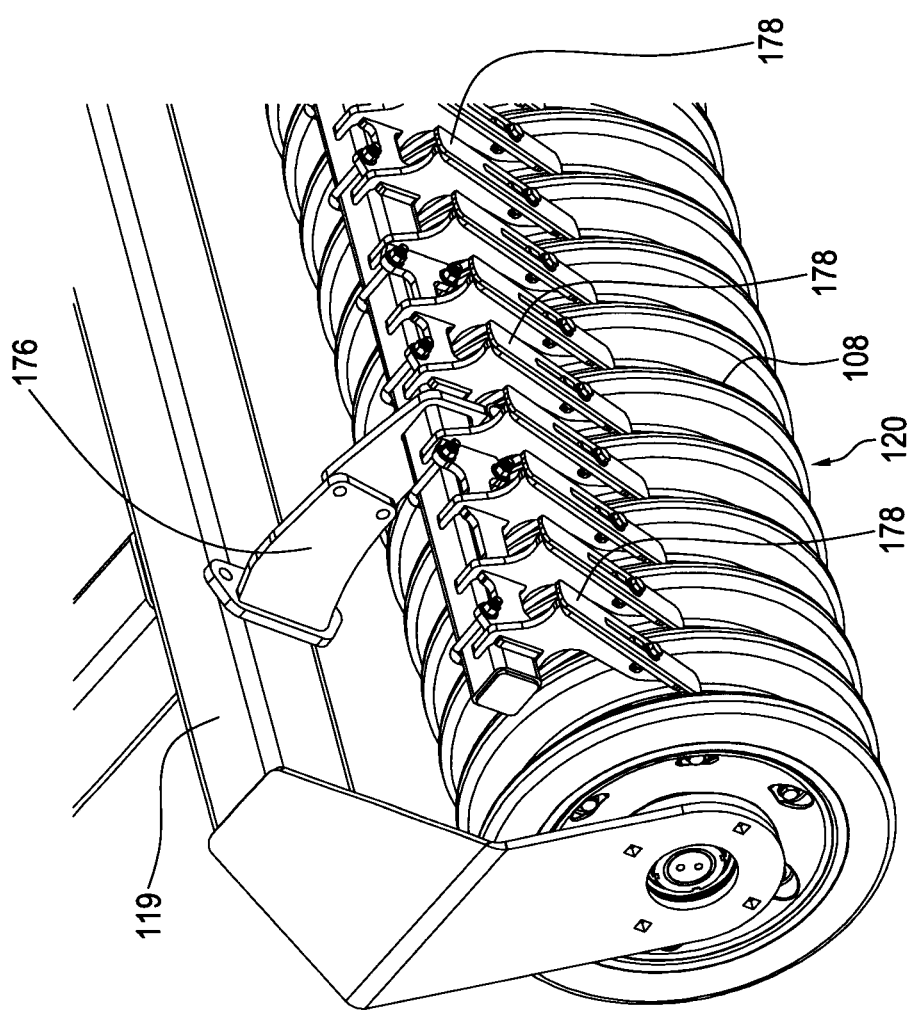
FIG. 10 is a close up view of the finishing tool shown in FIG. 8 showing the debris remover.

FIGS. 9 and 10 illustrate a debris removers 120 can also be provided to work in conjunction with the finishing tool 108. The debris removers 120 can be used to remove debris and other material lodged between protrusions on the surface of the finishing tool 108 if the finishing tool 108 is a roller having circumferentially running grooves in the surface of the roller as shown in FIGS. 8-10. The debris removers 120 can be attached to the finishing tool mount 119 via an arm 176 that may be curved. The debris remover 120 may be welded directly to the arm 176 or may be attached via one or more plates and mechanical fasteners such as nuts, bolts, and the like. The debris remover 120 can have a plurality of plates 178 that extend into the valleys present between protrusions in the surface of the finishing tool 108, and may be adapted to scrape out any debris present there without substantially damaging the roller.

Figure 11:
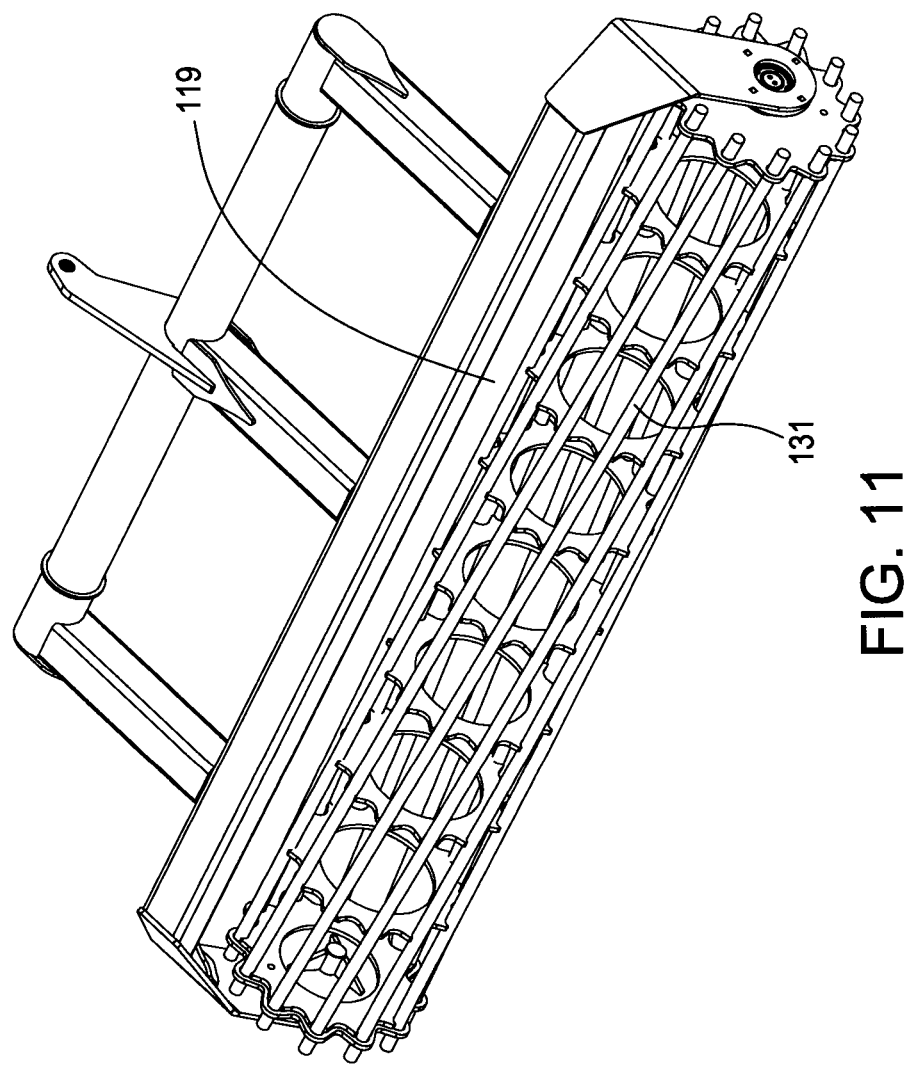
FIG. 11 is an illustration of a cage roller.

FIG. 11 illustrates a cage roller 131 that can be used with the cultivator 100 as the finishing tool 108 instead of a flat surfaced roller or grooved surface roller. The cage roller 131 may comprise internal discs with ridged perimeters. The cage roller 131 can be used instead of a more conventional roller to ensure the depth guidance of soil tillage by providing loose soil for use as a seed bed or the like. The cage roller 131 may be used as the finishing tool 108 used in the finishing tool mount 119.

Figure 12:
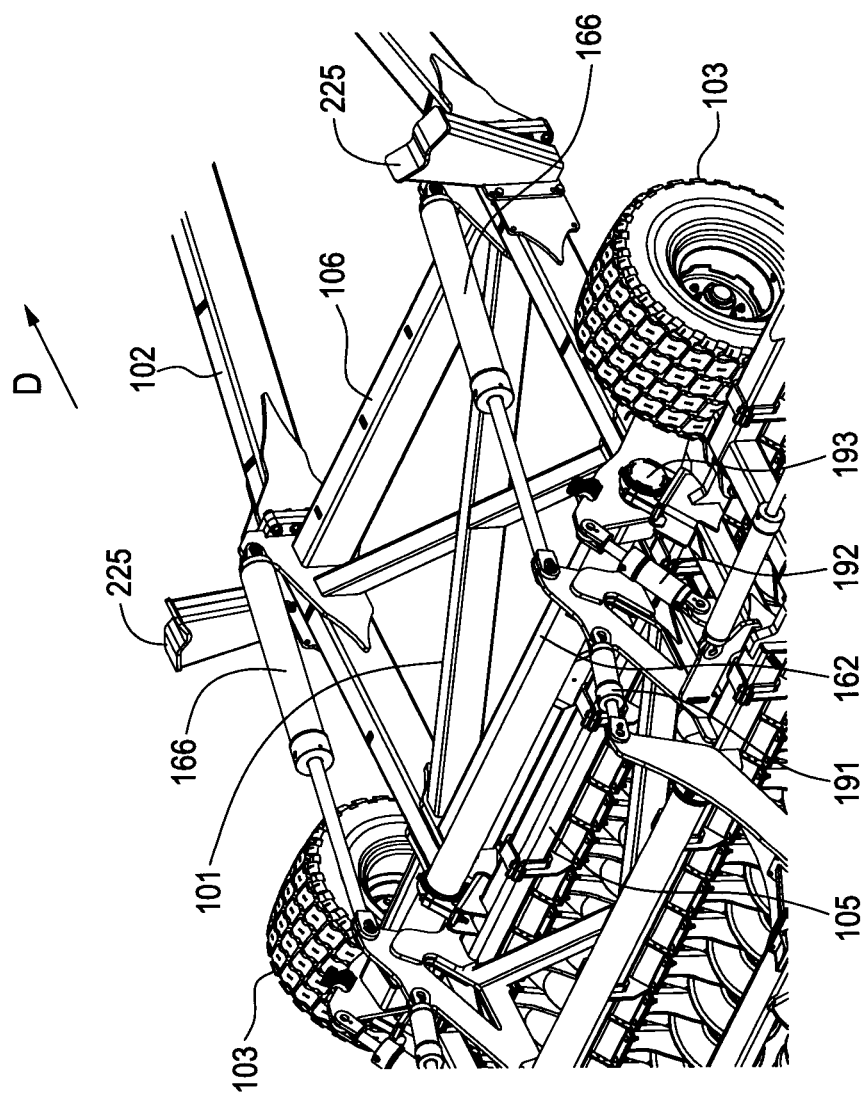
FIG. 12 is a close up perspective view of the frame of the cultivator where it is connected to the cultivating assembly.
Figure 13:
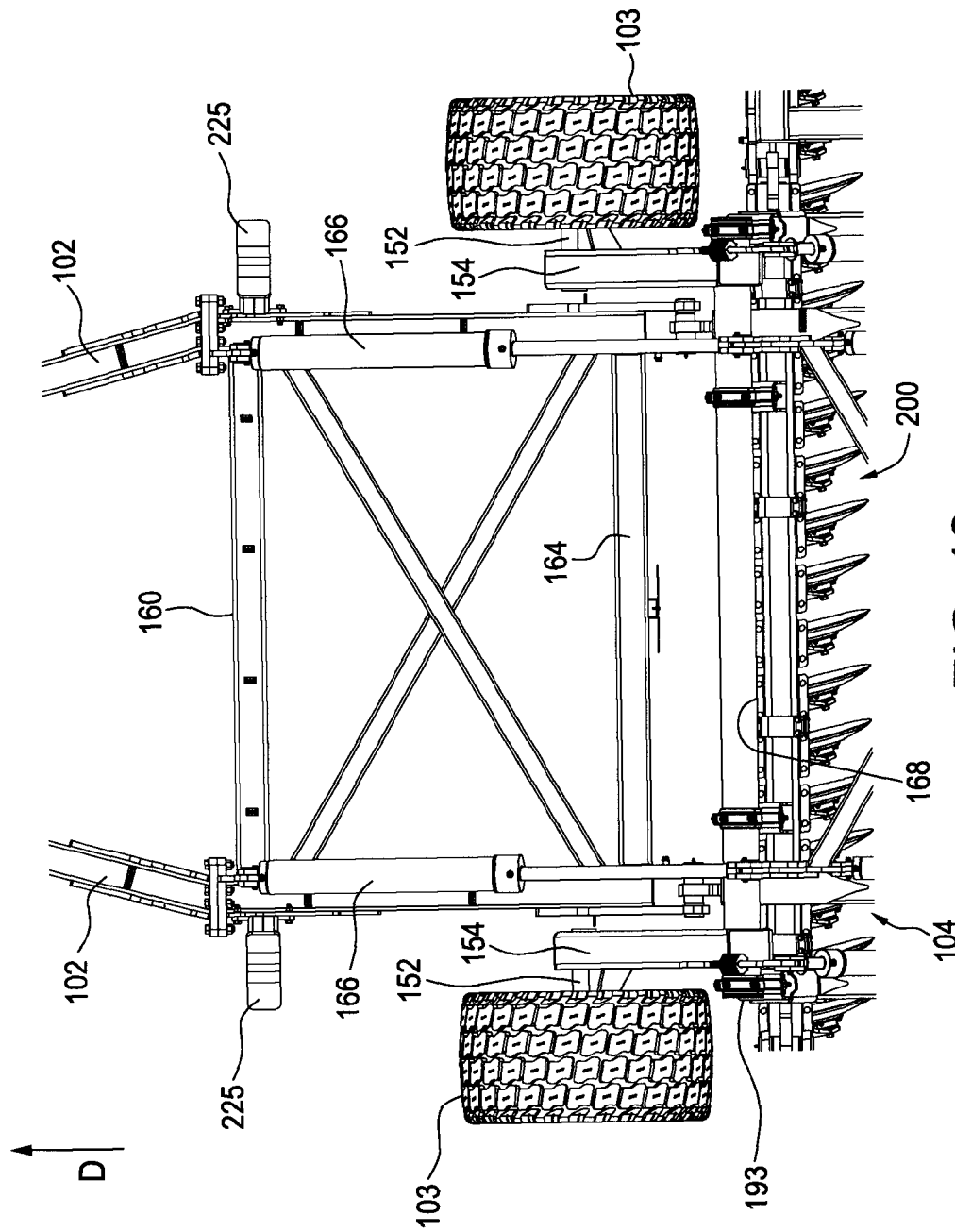
FIG. 13 is a close up top view of the frame of the cultivator where it is connected to the cultivating assembly.

Referring again to FIG. 2 the cultivating assembly 104 can have a number of different sections including: a center section 200; a first wing section 202; and a second wing section 204. The center section 200 of the cultivating assembly 104 can be pivotally connected to the rear end 162 of the frame 101 at a pivotal connection 164 so that the cultivating assembly 104 can be pivoted around the pivotal connection 164 relative to the frame 101 which forms an axis substantially perpendicular to the direction of travel D. FIGS. 12 and 13 illustrate more detailed views of the connection between the center section 200 of the cultivating assembly 104 and the frame 101. A pair of actuators 166 can be provided between the frame 101 and the carriage frame 105 that supports the discs 107. The actuators 166 can take the form of hydraulic cylinders or any other suitable actuator. The actuators 166 can rotate the carriage frame 105 relative to the frame 101 and around the pivot point 164. In this manner, the cultivating assembly 104 can be raised or lowered relative to the frame 101 by pivoting it around pivot point 164 using the actuators 166. The cultivator 100 can pivot the entire cultivator assembly 104 upwards and downwards relative to the frame 101 and around an axis perpendicular to the direction of travel D at the front end 168 of the cultivating assembly 104 allowing the entire cultivator assembly 104 to be lifted so that the discs 107 and the finishing tool 108 can be lifted away from contact with the ground. When the cultivating assembly 104 is pivoted upwards so that the discs 107 are out of contact with the ground, the ground wheels 103 and support wheels 150 can remain in contact with the ground surface and can be the only part of the cultivator 100 that is in contact with the ground. This allows an operator to lift the entire cultivating assembly 104 off the ground when turning around at the end of a row in a field, and turn the cultivator 100 with only the ground wheels 103 and support wheels 150 in contact the surface of the field. This also allows an operator to lift the entire cultivating assembly 104 off of the ground in order to drive forward, back up, unplug the cultivator assembly or drive away from a predicament in a field.

Referring again to FIGS. 2 and 4, the first wing section 202 and the second wing section 204 can be pivotally attached to the center section 200. The first wing section 202 can be pivotally attached at one end to a first side 201 of the center section 200 and one end of the second wing section 204 can be pivotally attached at one end to a second side 203 of the center section 200. In one aspect, a first actuators 210, such as a hydraulic cylinder, etc., can be provided between the center section 200 and the first wing section 202 and a second actuator 212, such as a hydraulic cylinder, etc., can be provided between the center section 200 and the second wing section 204 with the first actuator 210 and the second actuator 212 able to be retracted so that the first wing section 202 and the second wing section 204, respectively, are pivoted upwards relative to the center section 200 so that the first wing section 202 and second wing section 204 can be moved inwards towards the center of the cultivator and towards a position where the first side wing 202 and the second side wing 202 are perpendicular to the center section 200.

By having the first wing section 202 and the second wing section 204 pivotally connected to the sides 201, 203 of the center section 200, the sections of the cultivating assembly 104 can "float" and follow the curvature of varying terrain. If the first actuator 210 and second actuator 212 are hydraulic cylinders, they can be allowed to extend and retract freely or "float" allowing the first wing section 202, center section 200 and second wing section 204 to all pivot relative to one another. In this manner, these three independent sections of the cultivating assembly 104 can allow side to side countering for steep inclines, downward slopes, low mounds and/or ridges, etc.

In one aspect, the first wing section 202, second wing section 204 and the center section 200 can all be substantially the same width. Equal sized sections in the cultivating assembly 104 improve the ability of the cultivating assembly 104 to float and conform to different contours in the ground.

By allowing the cultivating assembly 104 to pivot freely relative to frame 101, the cultivator 100 can also float from front to back. This can be achieved by allowing the actuators 166 to freely retract and extend or "float" if they are hydraulic cylinders. This call allow the cultivator 100 to better cultivate hills or other ascents or descents present in a field being cultivated.

The first wing section 202, the second wing section 204 and the center section 200 can also allow the cultivator 100 to be positioned in a transport position.

Referring again to FIG. 2, the cultivator 100 can be provided with ground wheel 103 and support wheels 150 so that the cultivator 100 can be pulled through a field by a tractor or other tow vehicle and some of the weight of the cultivator 100 is supported by the ground wheels 103 and the support wheels 150. The ground wheels 103 and support wheels 150 are positioned so that they are provided in front of the cultivator assembly 104 when the cultivator 100 is in use. In this manner, any soil in the field that the ground wheels 103 or support wheels 150 pass over is cultivated after by the discs 107 and finishing tool 108 of the cultivating assembly 104.

The ground wheels 103 can be positioned so they are close to the frame 101 and the support wheels 150 can be positioned so that they further out to the sides of the cultivating assembly close to the outside edges of the cultivating assembly 104.

Referring again to FIG. 13, the position of the ground wheels 103 relative to the frame 101 and the cultivating assembly 104 can be seen. Each ground wheel 103 can be connected to the central section 200 of the cultivating assembly 104 by a support member 154. The ground wheel 103 can be attached to one end of the support member 154 by a rotatable shaft 152 and the other end of the support member 154 can be connected to the central section 200 of the cultivating assembly 104. The support member 154 can extend forwards and downwards from the central section 200 of the cultivating assembly 104 so that ground wheels 103 are positioned in front of the cultivating assembly 104 and to either side of the frame 101, with the ground wheels 103 resting on the ground. In one aspect, the support member 154 is angled forward and downwards from the central section 200 of the cultivating assembly 104.

The support member 154 can be pivotally connected to the cultivating assembly 104 around a pivoting shaft 193 so that the support member 154 can be pivoted to move the ground wheel 103 upwards and downwards relative to the carriage frame 105 allowing the discs 107 to be moved upwards and downwards relative to the ground surface, in turn. An actuator 192 such as a hydraulic cylinder, can be provided between the carriage frame 105 of the center section 200 and the support member 154 to pivot the support member 154 relative to the carriage frame 105.

Referring again to FIGS. 2 and 4, the support wheels 150 can be connected to the first wing section 202 and the second wing section 204 of the of the cultivating assembly 104 to help support he first wing section 202 and the second wing section 204 during operation of the cultivator 100. The support wheels 150 can be positioned in front of the cultivating assembly 104 and close to the outer edges of the cultivating assembly 104. Because the first wing section 202 and the second wing section 204 are pivotally connected at their inner ends to the center section 200, placing the support wheels 150 outwards towards their outer ends can help support the discs 107 connected to the first wing section 202 and the second wing section 204 help maintain the penetration of these discs 107 into the soil at desired depths.

Similar to the grounds wheels 103, the support wheels 150 can be connected to a shaft 156 pivotally connected to one end of a support member 158 where the other end of the support member 158 is connected to the first wing section 202 or the second wing section 204. The support member 158 can be positioned so that it extends forwards from the first wing section 202 or second wing section 204 and downwards so that the support wheels 150 are positioned in front of the cultivating assembly 104, but inboard from the outer edges of the cultivating assembly 104 so that the support wheels 150 travel along the surface of a field before the cultivating assembly 104 passes over the path the support wheels 150 have taken.

The support members 156 supporting the support wheels 150 can be pivotally connected to the cultivating assembly 104 so that the support members 156 can be pivoted to move the support wheels 150 upwards and downwards relative to the carriage frame 105 allowing the discs 107 to be moved upwards and downwards relative to the ground surface, in turn. An actuator 194 such as a hydraulic cylinder, can be provided between the carriage frame 105 of the first side wing 202 or the second side wing 204 and the support member 154 to pivot the support member 154 relative to the carriage frame 105. In one aspect, the actuators 192 and actuator 194 can be operably linked so that they pivot all of the ground wheels 103 and support wheels 150 at the same time.

Because of the positioning of the ground wheels 103 and the support wheels 150 relative to the cultivating assembly 104, the paths the ground wheels 103 and support wheels 150 take is passed over by the cultivating assembly 104 and mixed and leveled by the discs 07 and finishing tool 108.

The height of the carriage frames 105 relative to the ground surface and therefore the depth the discs 107 penetrate the ground surface of the soil can easily be adjusted by varying the height of the finishing tool 108 and/or the ground wheels 103 and support wheels 150 relative to the carriage frame 105. The finishing tool 108 can be raised and lowered relative to the carriage frame 105 by pivoting the finishing tool mount 119 relative to the carriage frame 105 and the ground wheels 103 and support wheels 150 can be raised or lowered relative to carriage frame 105 by pivoting the support members 154 and 156 relative to the carriage frames 105. Because the finishing tool 108 can be raised or lowered independently from the raising and lowering of the ground wheels 103 and support wheels 150 and vice versa, the angle of the carriage frame 105 can also be altered. This allows the angle of the cultivating assembly 104 to be adjusted so that the first row of discs 110 and the second row of discs 111 are penetrating the ground surface at different depths by tilting the cultivating assembly either forwards or backwards by adjusting the height of the ground wheels 103 and support wheels 150 and adjusting the height of the finishing tool 108.

In one embodiment, all of the ground wheels 103 and support wheels 150 are attached to the respective support members 154, 156 so that the wheels are fixed to travel only in the direction of travel D rather than being attached as castor wheels allowing them to turn in other directions independent of the rest of the cultivator 100. In this manner, the ground wheels 103 and support wheels 150 will always be aimed in the direction of travel D of the cultivator 100.

This ability to vary the depths of the first row of discs 110 relative to the second row of discs 11 has been found to be very useful. For example, because the first row of discs 110 can all be angled in a first direction from the direction of travel D, this angling of the first row of discs 110 can cause the entire cultivator 100 to slew over in the direction the first row of discs 110 is angled rather than continuing to travel straight in the direction of travel D. This is especially common when the ground surface is quite hard because as the discs 107 in the first row of discs 110 penetrate this hard ground surface, the force imposed on these discs 107 is transferred through the cultivating assembly 104 and to the cultivator 100 which can force the cultivator 100 to slew. If the discs 107 in the first row of discs 110 are set at the same depth as the discs 107 in the second row of discs 111, the force imposed on the cultivating assembly 104 by the second row of discs 111 (which are angled in the opposite direction from the discs 107 in the first row of discs 110) is usually much less because the ground surface has already been partially broken up by the first row of discs 110.

By using the height of the ground wheels 103 and support wheels 150 relative to the height of the finishing tool 108 to angle the front end 165 of the cultivating upwards, the depth of the discs 107 in the second row of discs 111 can be made greater than the depth of the discs 107 in the first row of discs 110 causing the discs 107 in the second row of discs 111 to penetrate the ground more than the discs 107 in the first row of discs 110 thereby reducing or even eliminating the cultivator 100 from skewing from the direction of travel in the direction the discs 107 in the first row of discs 110 are angled.

The ground wheels 103 and the support wheels 150 can be substantially large wheels; much larger than would typically be used on prior art cultivators. The use of substantially large wheels can allow the cultivator 100 to traverse terrain that alternative cultivators are not able to. The diameter of the ground wheels 103 and support wheels 150 can comprise an increased length to enable the cultivator 100 to travel through muddy portions of soil and standing water, clay, etc. Additionally, the use of large, wide wheels for the ground wheels 103 and the support wheels 150 can increase the floatation of the ground wheels 103 and support wheels 150 allowing the cultivator 100 to be pulled over muddy fields or even standing water with the large size of the wheels causing the ground wheels 103 and the support wheels 150 to float on the wet soil in the field rather than plowing into the wet soil, creating ruts, increasing the force needed to pull the cultivator 100 and even causing the cultivator 100 to get stuck. By increasing the diameter and/or width of the ground wheels 103 and the support wheels 150, embodiments of the present invention may perform much better than previous cultivator designs. The ground wheels 103 and the support wheels 150 in accordance with embodiments of the present invention are much larger than wheels of previous cultivators. For example, the ground wheels 103 and the support wheels 150 may comprise at least 30 inches in diameter, 34 inches in diameter or greater. In some embodiments, the ground wheels 103 and the support wheels 150 may comprise at least 42 or 44 inches in diameter or larger. In some embodiments, the ground wheels 103 and the support wheels 150 may comprise from between about 18 inches to about 30 inches in width. In some embodiment the grounds wheels 103 and support wheels 150 can be greater than 21 inches wide, greater than 24 inches wide and even greater than 28 inches wide.

Including larger ground wheels 103 and support wheels 150 may produce a more stable frame 101. Additionally, the use of very wide ground wheels 103 and support wheels 150 in addition to fixing the direction of the ground wheels 103 and support wheels so that they can only travel in the direction of travel D of the cultivator 100 has resulted in an unexpected advantage. The use of wide ground wheels 103 and support wheels 150 increases the tendency of the ground wheels 103 and the support wheels 150 to slide along the ground when the cultivator 100 is being turned. This can allow an operator towing the cultivator 100 to perform tighter turns by having these ground wheels 103 and support wheels 150 slide to one side when the cultivator 100 is being turned.

Because the ground wheels 103 and support wheels 150 are all positioned in front of the cultivator assembly 104 when the cultivator 100 is being used for cultivating a field, the impact of the ground wheels 103 and the support wheels 150 is minimized because any soil that is compacted or disturbed by the ground wheels 103 and support wheels 150 passing over it is mixed up by the discs 107 on the cultivating assembly 104. By placing the ground wheels 103 and the support wheels 150 in front of the cultivating assembly 104 and having discs 107 on the cultivating assembly 104 pass over the path the ground wheels 103 and the support wheels 150 take, the cultivator 100 can use much wider wheels without the conventional worries about using larger wheels.

In addition to the ground wheels 103 and support wheels 150 being substantially large, the diameter of the ground wheels 103 and the support wheels 150 can be greater than the diameter of the discs 107. For example the diameter of the ground wheels 103 and the support wheels 150 can be from about double to about quadruple the diameter of the discs 107.

A top view of ground wheel 103, in one aspect, can be seen in FIG. 13, with the treads on the surface of the ground wheel 103 clearly shown. In some embodiments, the specific configuration of treads shown on the ground wheel 103 depicted in FIG. 13 can be included for increased traction over prior cultivator tire designs. In some embodiments, the treads may comprise protrusions. In some embodiments, the protrusions may be angled upwardly toward the center of the ground wheel 103, each protrusion divided separately by a channel in the surface of the ground wheel 103. In some embodiments, a center line of tread may comprise pyramid shaped structures, or the like. In some embodiments, the pyramid structure may be missing a notch and the top of the period may be cut off. The support wheels 150 can have the same tread pattern as the ground wheels 103 or a different tread pattern.

Figure 14:
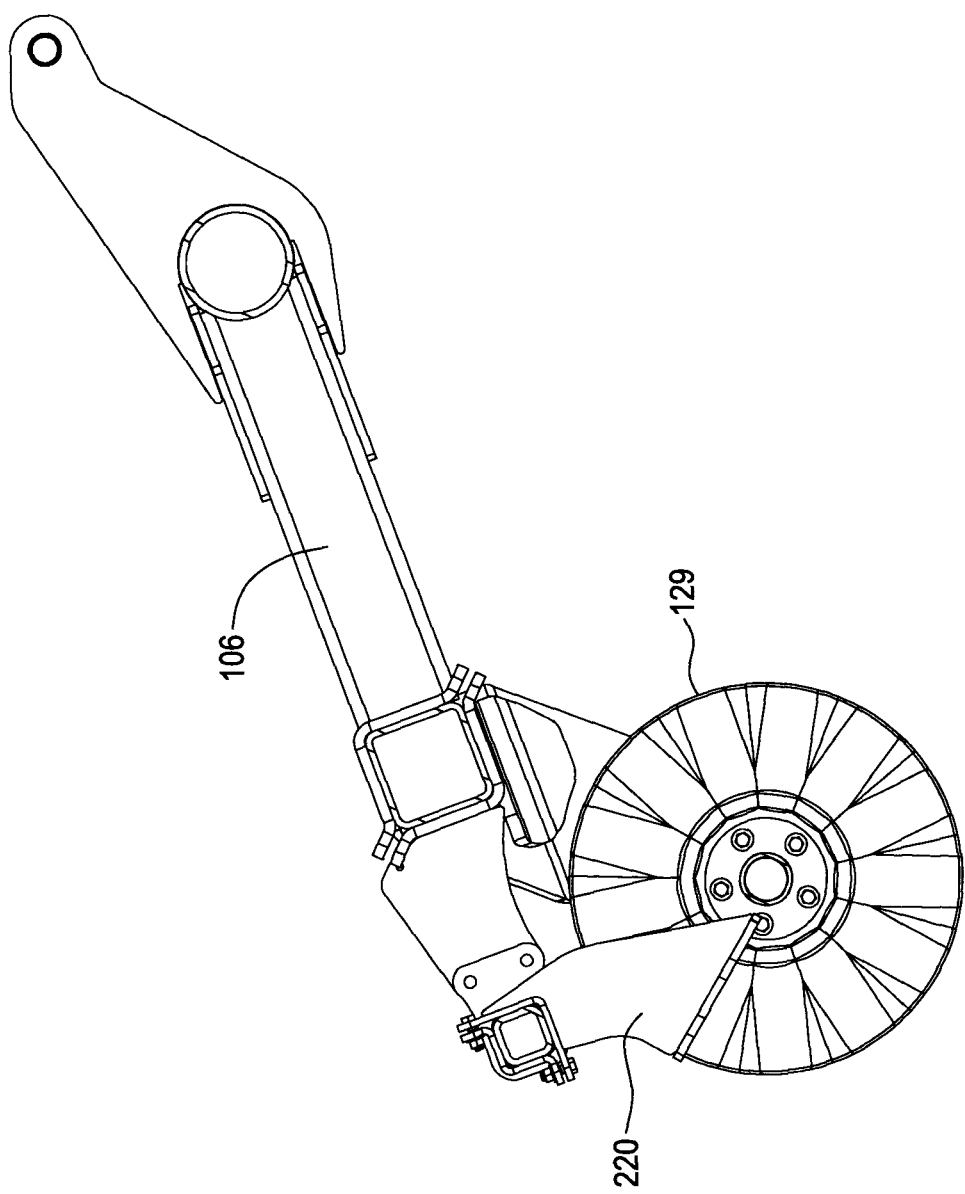
FIG. 14 is a side view of an alternative disc.

FIG. 14 illustrates an alternative disc 129 that can be used instead of discs 107 on the cultivating assembly 104. Discs 129 are waved discs that can be flat in profile rather than convex. The waved discs 129 may comprise a waved formation and may enter the soil in a waved pattern. As such, the waved discs 129 may be placed in a straightforward configuration, rather than the angled configuration of the straight discs 107 described previously. In one aspect, all of the waved discs 129 may be independently rotatable around independent axis, or may be coupled with a single axis. In one aspect, a scraper 220 can be provided to try and prevent mud and debris from building up on the wave disc 129.

Figure 15:
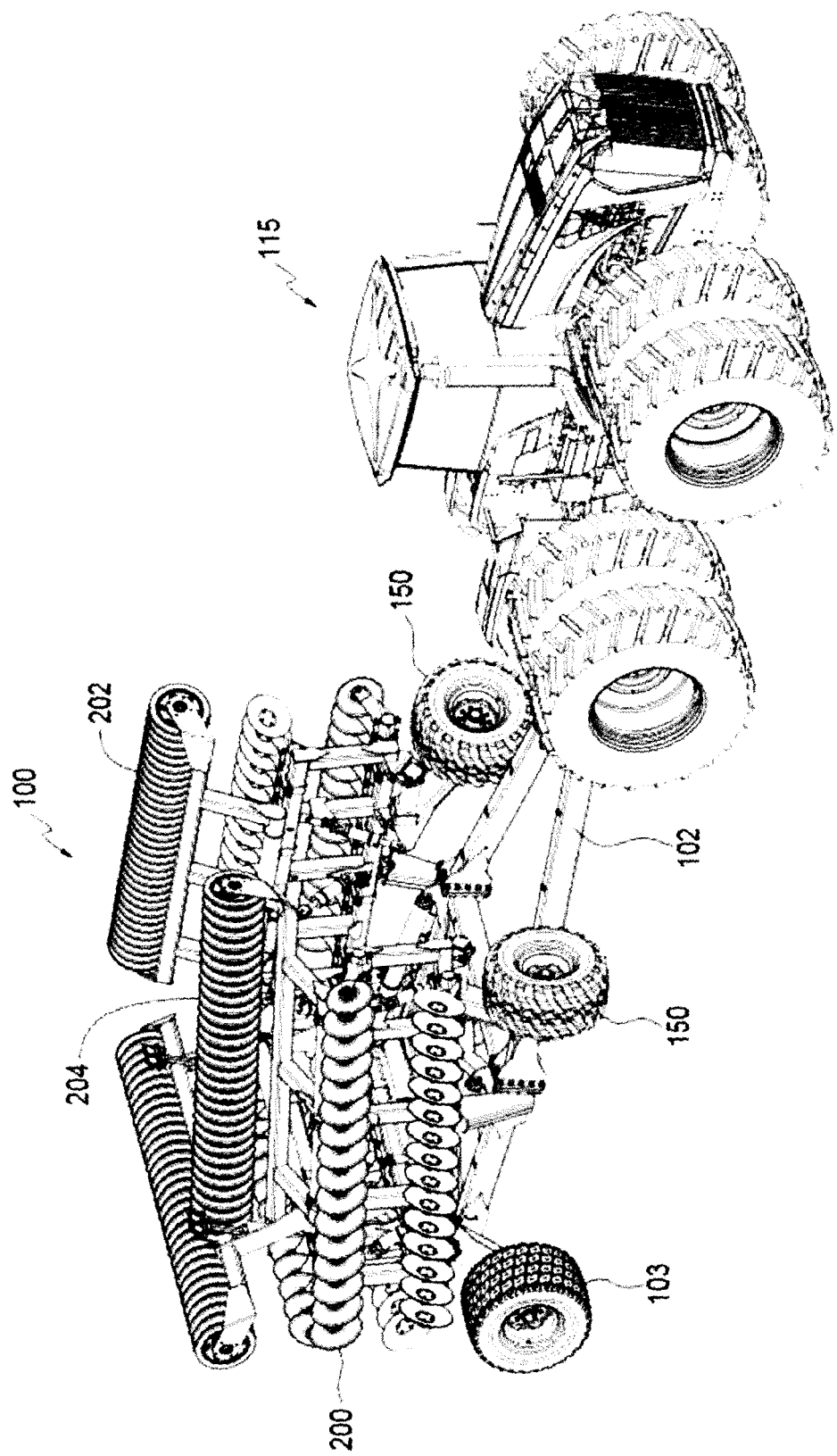
FIG. 15 is an illustration of the cultivator in a transport position.

The cultivator 100 can be placed in a transport position where the cultivator 100 rides only on the ground wheels 103 and the overall width of the cultivator assembly 104 is to significantly reduced by folding the first wing section 202 and the second wing section 204 in towards the frame 101 to make transport of the cultivator 100 easier. This is especially useful on roads where the cultivator 100 in the transport position is narrow enough to travel on the roads and still low enough to pass under many bridges, power lines and other overhead obstacles. FIG. 15 illustrates the cultivator 100 being pulled by a tractor 115 while in its transport position.

Figure 16:
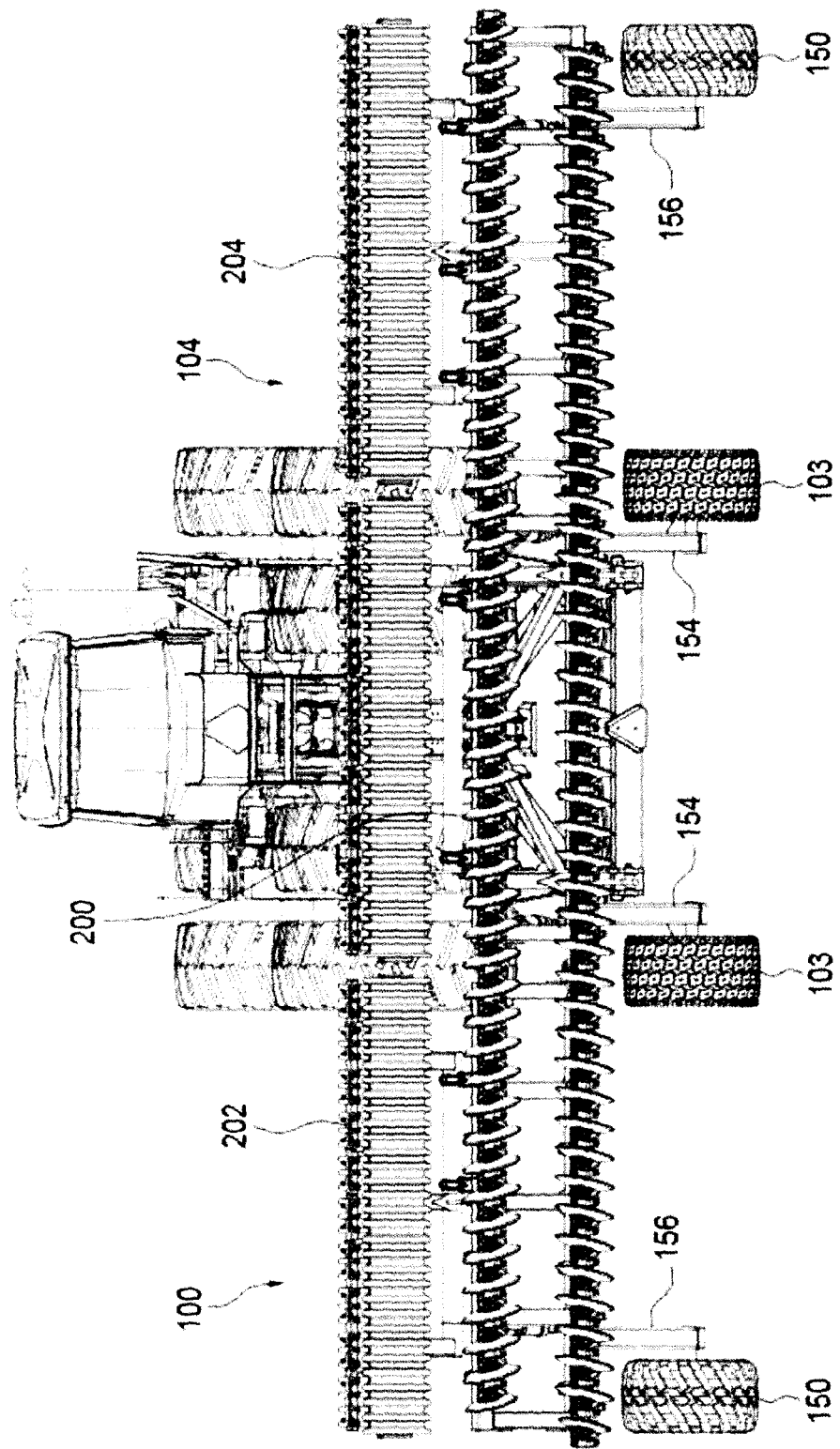
FIG. 16 is a rear view of the cultivator being placed in the transport position.

To place the cultivator 100 in the transport position, the cultivating assemble 104 can be pivoted upwards around pivot point 164 by actuators 166 so that the cultivating assembly 104 is lifted off the ground while the ground wheels 103 and support wheels 150 remain on the ground as shown in FIG. 16. At this point, both the first wing section 202 and the second wing section 204 can be rotated along with the center section 200 of the cultivating assembly 104. The entire cultivating assembly 104 can continue to be rotated upwards until it is near perpendicular to the frame 101.

Figure 17:
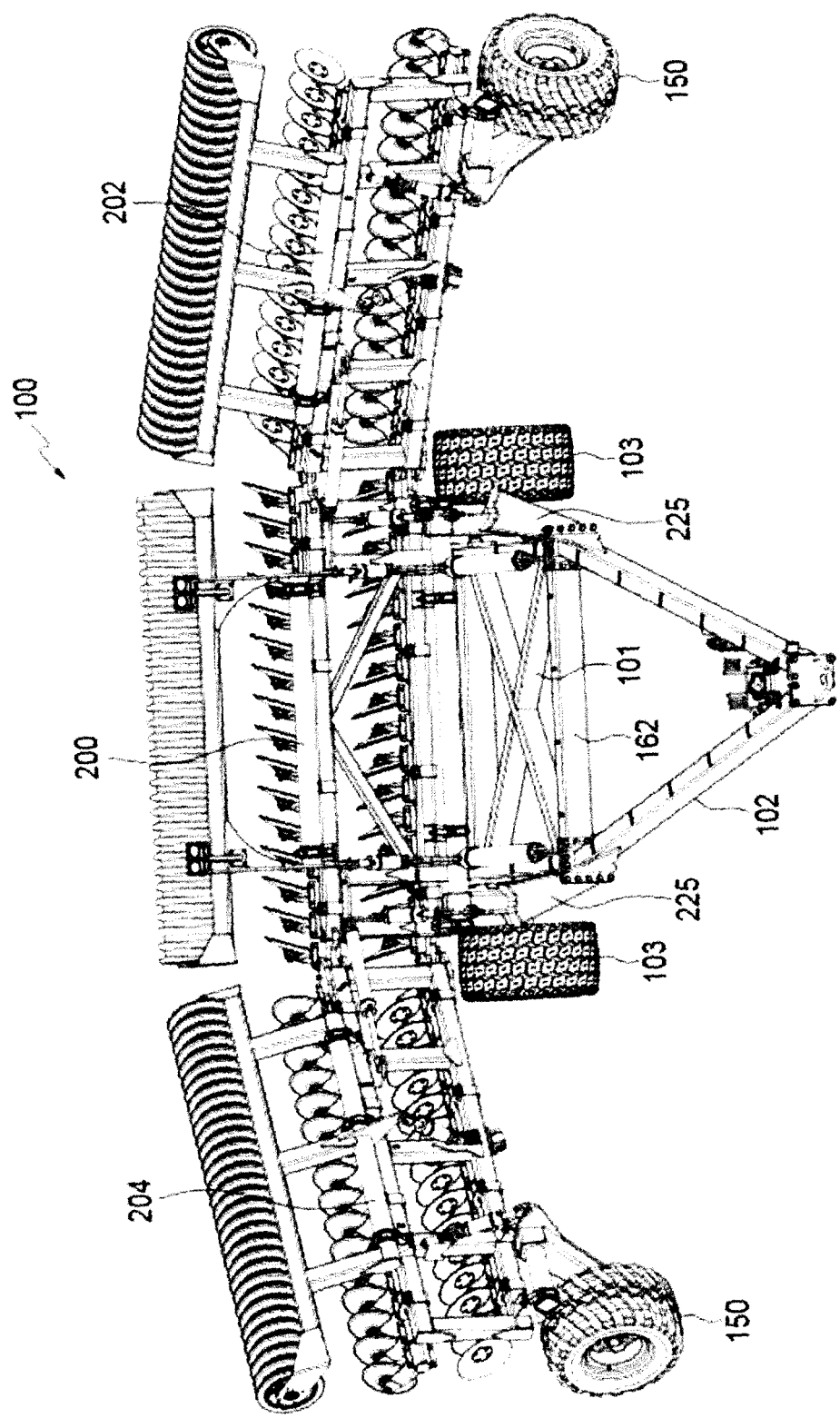
FIGS. 17 and 18 are front views of the cultivator being placed in the transport position.
Figure 18:
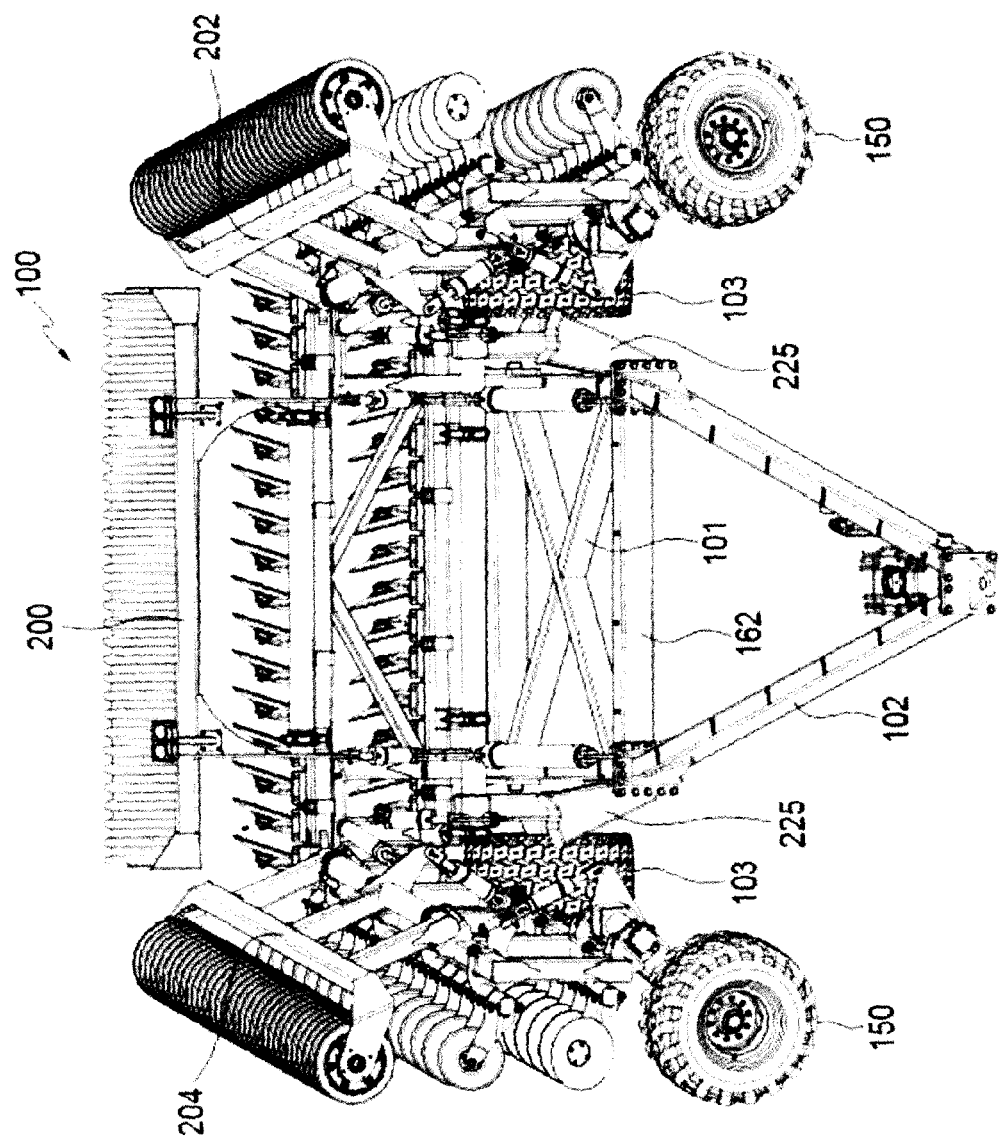

When the entire cultivating assembly 104 has been pivoted upwards, the first wing section 202 and the second wing section 204 can be pivoted relative to the center section 200 so that the first wing section 202 and the second wing section 204 are pivoted in towards the frame 101 as shown in FIGS. 17 and 18. Cradles 226 can be provided towards the front end 162 of the frame 101 that can support the first wing section 202 and the second wing section 204 when the first wing section 202 and the second wing section 204 are folded into the transport position.

Figure 19:
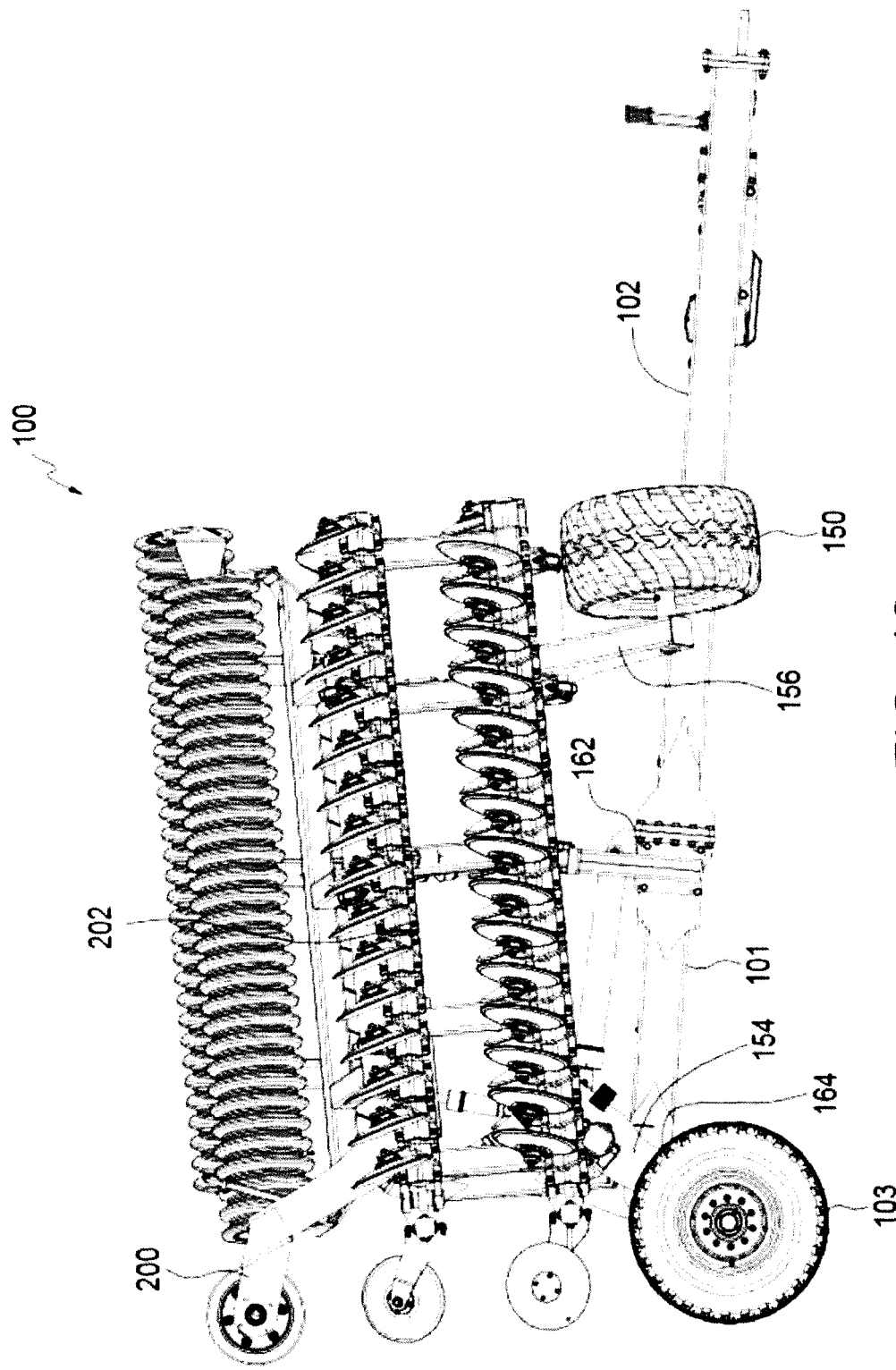
FIG. 19 is a side view of the cultivator in the transport position.

FIG. 19 is a side view of the cultivator 100 in the transport position. The only portion of the cultivator 100 in contact with a ground surface is the ground wheels 103. B y rotating the center section 200 of the cultivator assembly 104 near but not quite perpendicular, when the first side section 202 and the second side section 204 are rotated inwards towards the frame 101, the support wheels 150 are positioned above the ground surface as a result of the backwards slant of the center section 200.

Additionally, if the support member 154 that connects the ground wheels 103 to the center section is angled enough relative to the carriage frame 105, the angling of the support member 154 will cause the ground wheels 103 to move backwards from their position adjacent to the sides of the rear end 162 of the frame 101 as the cultivating assembly 104 is pivoted upwards with respect to the frame 101 and move backwards towards the rear of the cultivator 100. In this manner, the ground wheels 103 are moved further backwards under the center section 200 or even behind the frame 101 when the cultivator assembly 100 is placed in the transport position to improve the stability of the cultivator 100 when it is towed in the transport position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A cultivator comprising:
a frame having a front end and a rear end;
a tow assembly attached to the front end of the frame so the cultivator can be towed by a tow vehicle in a direction of travel;
a cultivating assembly pivotally attached at a front end of the cultivating assembly to the rear end of the frame so that the cultivation assembly is pivotal around a first axis substantially perpendicular to the direction of travel of the cultivator, the cultivating assembly having at least one carriage frame and a plurality of discs attached to the at least one carriage frame, each disc positioned to extend below the at least one carriage frame and come into contact with a ground surface beneath the cultivating assembly; and
a pair of ground wheels,
wherein the cultivator is transformable between an operating position and a transport position by pivoting the cultivating section upwards around the first axis,
and wherein the pair of ground wheels are positioned in front of the cultivating assembly when the cultivator is in the operating position and the pair of ground wheels are moved backwards towards the rear end of the frame when the cultivator is transformed into the transport position.

2. The cultivator of claim 1 further comprising a finishing tool operatively connected to the carriage frame and positioned behind the plurality of discs so that the finishing tool passes over the ground surface the discs have passed over when the cultivator is towed in the direction of travel when the cultivator is used to cultivate a field.

3. The cultivator of claim 2 wherein the finishing tool is a roller pivotally attached to the carrier by a finishing tool mount.

4. The cultivator of claim 1 wherein each disc is attached to the carriage frame by a disc arm.

5. The cultivator of claim 4 wherein there is a single arm for each disc.

6. The cultivator of claim 5 wherein the disc arm is connected to the carriage frame by a biasing member adapted to allow the disc arm to pivot relative to the carriage frame.

7. The cultivator of claim 1 wherein the plurality of discs comprise a first row of discs and a second row of discs, the second row of discs positioned behind the first row of discs.

8. The cultivator of claim 7 wherein the discs in the first row of discs are angled in a first direction and the discs in the second row of discs are angled in a second direction, the first direction being opposite to the second direction.

9. The cultivator of claim 8 wherein the first row of discs comprises a concavity opposite from the second row of discs.

10. The cultivator of claim 1 wherein all the wheels of the cultivator are provided in front of the discs on the cultivator assembly when the cultivator is used to cultivate a field.

11. The cultivator of claim 1 wherein each of the pair of ground wheels comprise at least thirty four inches in diameter.

12. The cultivator of claim 1 wherein each of the pair of ground wheels comprises at least forty four inches in diameter.

13. The cultivator of claim 1 wherein each of the pair of ground wheels comprises at least twenty one inches in width.

14. The cultivator of claim 1 wherein each of the of the pair of ground wheels ground wheels comprises at least and at least twenty five inches in width.

15. The cultivator of claim 1 wherein the cultivating assembly further comprises:
a center section having a front end, a rear end, a first side and a second side, the center section pivotally connected at the front of the center section to the rear end of the frame so that the center section can pivot around the first axis;
a first wing section pivotally connected at one side of the first wing section to the first side of the center section;
a second wing pivotally connected at one side of the second wing section to the second side of the center section; and
each of the center section, the first wing section and the second wing section comprising:
a carriage frame; and
a plurality of discs attached to the carriage frame;

and wherein the pair of grounds wheels are connected to the center section.

16. The cultivator of claim 15 wherein the center section is pivotal relative to the frame around the first axis so that the center section can pivot upwards towards a position substantially perpendicular to the frame.

17. The cultivator of claim 16 wherein the first wing section is pivotal relative to the center section towards a position substantially perpendicular to the center section and wherein the second wing section is pivotal relative to the center section towards a position substantially perpendicular to the center section.

18. The cultivator of claim 17 wherein the first wing section, the center section and the second wing section all have substantially the same width.

19. The cultivator of claim 17 wherein the cultivator is transformable from the operating position to the transport position by pivoting the center section of the cultivating assembly upwards relative to the rear end of the frame and pivoting the first wing section relative to the center section and pivoting the second wing section relative to the center section so that the center section is positioned near perpendicular to the frame and the first wing section and the second wing section are pivoted towards the frame and extending towards a front end of the frame.

20. The cultivator of claim 19 wherein when the cultivator is in the transport position, only the pair of ground wheels are in contact with the ground surface.

21. The cultivator of claim 19 wherein the pair of ground wheels are connected to the center section by a support member that extends forward from the center section and angles downward from the center section when the cultivator is in the operating position, and wherein when the center section is pivoted upwards around the first axis the support members moves the ground wheels backwards relative to the frame to increase the weight of the cultivator being supported by a hitch on a tow vehicle.

22. The cultivator of claim 21 wherein the ground wheels are positioned substantially below the center section when the cultivator is in the transport position.

23. The cultivator of claim 21 wherein the ground wheels are positioned behind the rear end of the frame with the cultivator is in the transport position.

24. The cultivator of claim 21 wherein the support member connected between each of the pair of ground wheels and the center section is pivotally to connected to the center section.

25. The cultivator of claim 15 wherein a first support wheel is connected to the first wing section by a first support member and wherein a second support wheels is connected to the second wing section by a second support member.

26. The cultivator of claim 25 wherein the first support wheel and the second support wheel are substantially the same size as the pair of ground wheels.

27. The cultivator of claim 25 wherein the first support member is pivotally connected to the first wing section and wherein the second support member is pivotally connected to second wing section.

28. The cultivator of claim 19 wherein the center section is less than 25 feet wide and when the cultivator is positioned in the transport position the width of the cultivator is less than 25 feet.

29. The cultivator of claim 19 wherein the center section is angled less than vertical in the transport position.

30. The cultivator of claim 1 wherein the pair of ground wheels are fixedly attached to be directed only in the direction of travel.

31. The cultivator of claim 25 wherein the support wheels are each fixedly attached to be directed only in the direction of travel.

32. The cultivator of claim 19 wherein the combined length of the tow assembly and the frame is greater than each of the width of the first wing section and the width of the second wing section.

33. A cultivator comprising:
a frame having a front end and a rear end;
a tow assembly attached to the front end of the frame so the cultivator can be towed by a tow vehicle in a direction of travel;
a cultivating assembly comprising: a center section having a front end, a rear end, a first side and a second side, the center section pivotally connected at the front of the center section to the rear end of the frame so that the center sections is pivotal around a first axis substantially perpendicular to the direction of travel of the cultivator;
a first wing section pivotally connected at one side of the first wing section to the first side of the center section;
a second wing pivotally connected at one side of the second wing section to the second side of the center section; and
each of the center section, the first wing section and the second wing section comprising:
a carriage frame; and
a plurality of discs attached to the carriage frame, and a pair of ground wheels connected to the center section, the pair of ground wheels positioned in front of the center section when the cultivating assembly is being used to cultivate a field;
wherein the cultivator is transformable between an operating position and a transport position by pivoting the cultivating section upwards around the first axis,
and wherein the pair of ground wheels are positioned in front of the cultivating assembly when the cultivator is in the operating position and the pair of ground wheels are moved backwards towards the rear end of the frame when the cultivator is transformed into the transport position.

34. The cultivator of claim 33 further comprising for each of the center section, the first wing section and the second wing section, a finishing tool operatively connected to the carriage frame and positioned behind the plurality of discs connected to the carriage frame so that the finishing tool passes over the ground surface the discs have passed over when the cultivator is towed in the direction of travel when the cultivator is used to cultivate a field, wherein a height of the finishing tool is adjustable relative to the carriage frame.

35. The cultivator of claim 34 wherein the finishing tool is a roller pivotally attached to the carrier by a finishing tool mount.

36. The cultivator of claim 33 wherein each disc is attached to the carriage frame by a disc arm.

37. The cultivator of claim 36 wherein there is a single arm for each disc.

38. The cultivator of claim 37 wherein the disc arm is connected to the carriage frame by a biasing member adapted to allow the disc arm to pivot relative to the carriage frame.

39. The cultivator of claim 33 wherein for each of the center section, the first wing section and the second wing section, the plurality of discs comprise a first row of discs and a second row of discs, the second row of discs positioned behind the first row of discs.

40. The cultivator of claim 39 wherein the discs in the first row of discs are angled in a first direction and the discs in the second row of discs are angled in a second direction, the first direction being opposite to the second direction.

41. The cultivator of claim 40 wherein the first row of discs comprises a concavity opposite from the second row of discs.

42. The cultivator of claim 33 wherein all of the wheels of the cultivator are provided in front of the discs on the cultivator assembly when the cultivator is used to cultivate a field.

43. The cultivator of claim 33 wherein each of the pair of ground wheels comprise at least thirty four inches in diameter.

44. The cultivator of claim 33 wherein each of the pair of ground wheels comprises at least forty four inches in diameter.

45. The cultivator of claim 33 wherein each of the pair of ground wheels comprises at least twenty one inches in width.

46. The cultivator of claim 33 wherein each of the of the pair of ground wheels ground wheels comprises at least and at least twenty five inches in width.

47. The cultivator of claim 33 wherein the center section is pivotal relative to the frame around the first axis so that the center section can pivot upwards towards a position substantially perpendicular to the frame.

48. The cultivator of claim 47 wherein the first wing section is pivotal relative to the center section towards a position substantially perpendicular to the center section and wherein the second wing section is pivotal relative to the center section towards a position substantially perpendicular to the center section.

49. The cultivator of claim 33 wherein the first wing section, the center section and the second wing section all have substantially the same width.

50. The cultivator of claim 33 wherein the cultivator is transformable from the operating position to the transport position by pivoting the center section of the cultivating assembly upwards relative to the rear end of the frame and pivoting the first wing section relative to the center section and pivoting the second wing section relative to the center section so that the center section is positioned near perpendicular to the frame and the first wing section and the second wing section are pivoted towards the frame.

51. The cultivator of claim 33 wherein when the cultivator is in the transport position, only the pair of ground wheels are in contact with the ground surface.

52. The cultivator of claim 50 wherein the pair of ground wheels are connected to the center section by a support member that extends forward from the center section and angles downward from the center section when the cultivator is in the operating position, and wherein when the center section is pivoted upwards around the first axis the support members moves the ground wheels backwards relative to the frame to increase the weight of the cultivator being supported by a hitch on a tow vehicle.

53. The cultivator of claim 52 wherein the ground wheels are positioned substantially below the center section when the cultivator is in the transport position.

54. The cultivator of claim 53 wherein the ground wheels are positioned behind the rear end of the frame with the cultivator is in the transport position.

55. The cultivator of claim 52 wherein the support member connected between each of the pair of ground wheels and the center section is pivotally connected the center section.

56. The cultivator of claim 55 further comprising a first support wheel operatively connected to the first wing section and positioned in front of the first wing section when the cultivating assembly is cultivating a field and a second support wheel operatively connected to the second wing section and position in front of the second wing section when the cultivating assembly is cultivating a field.

57. The cultivator of claim 56 wherein the first support wheel is connected to the first wing section by a first support member and wherein the second support wheels is connected to the second wing section by a second support member.

58. The cultivator of claim 57 wherein the first support member is pivotally connected to the first wing section and wherein the second support member is pivotally connected to second wing section.

59. The cultivator of claim 50 wherein the center section is angled less then vertical in the transport position.

60. The cultivator of claim 33 wherein the pair of ground wheels are fixed attached to be directed only in the direction of travel.

61. The cultivator of claim 56 wherein the support wheels are each fixedly attached to be directed only in the direction of travel.

62. The cultivator of claim 50 wherein the combined length of the tow assembly and the frame is greater than each of the width of the first wing section and the width of the second wing section.

63. The cultivator of claim 34 wherein a height of the ground wheels is adjustable relative to the carriage frame and independently from the height of the finishing tool, and wherein an angle of the carriage frame can be altered by adjusting the height of the finishing tool relative to the carriage frame and the height of the ground wheels relative to the carriage frame independently.

* * * * *